United States Patent
Makino et al.

(10) Patent No.: US 12,407,763 B2
(45) Date of Patent: Sep. 2, 2025

(54) PREDETERMINED PROCESSING BASED ON A USER OPERATION PERFORMED ON A WEBSITE

(71) Applicant: PLAID, INC., Tokyo (JP)

(72) Inventors: Yuki Makino, Tokyo (JP); Takehiko Iwakawa, Tokyo (JP); Masahiro Takanohashi, Tokyo (JP)

(73) Assignee: PLAID, INC., Tokyo (JP)

( * ) Notice: Subject to any disclaimer, the term of this patent is extended or adjusted under 35 U.S.C. 154(b) by 2 days.

(21) Appl. No.: 18/568,699

(22) PCT Filed: Feb. 2, 2022

(86) PCT No.: PCT/JP2022/003968
§ 371 (c)(1),
(2) Date: Dec. 8, 2023

(87) PCT Pub. No.: WO2022/259602
PCT Pub. Date: Dec. 15, 2022

(65) Prior Publication Data
US 2024/0275858 A1 Aug. 15, 2024

(30) Foreign Application Priority Data
Jun. 10, 2021 (JP) ................................ 2021-097020

(51) Int. Cl.
*H04L 67/50* (2022.01)
*G06F 16/957* (2019.01)

(52) U.S. Cl.
CPC ........ *H04L 67/535* (2022.05); *G06F 16/9577* (2019.01)

(58) Field of Classification Search
CPC ... H04L 67/535; H04L 67/02; G06F 16/9577; G06F 13/00; G06Q 30/02
(Continued)

(56) References Cited

U.S. PATENT DOCUMENTS

2011/0271175 A1* 11/2011 Lavi ..................... G06F 16/9577
715/234
2012/0291143 A1* 11/2012 Ajitomi ............... G06F 21/6218
726/30
(Continued)

FOREIGN PATENT DOCUMENTS

JP 2003-050943 A 2/2003
JP 2004326537 A * 11/2004
(Continued)

OTHER PUBLICATIONS

Notice of Reasons for Refusal dated Oct. 29, 2024 issued in the corresponding Japanese Patent Application No. 2021-097020, with English machine translation.
(Continued)

*Primary Examiner* — Tan Doan
(74) *Attorney, Agent, or Firm* — Rimon P.C.

(57) ABSTRACT

Conventionally, useful processing cannot be performed using operation information on two or more sites. With an information processing device that includes: an operation information reception unit that receives one or more pieces of first operation information regarding a user on a first site, and one or more pieces of second operation information regarding the user on a second site; an attribute value acquisition unit that acquires a first attribute value of the user, using the one or more pieces of first operation information, and acquires a second attribute value of the user, using the one or more pieces of second operation information; and a site processing unit that performs predetermined processing on the first site or the second site, using the first attribute value and the second attribute value, it is possible to perform useful processing using operation information on two or more sites.

9 Claims, 15 Drawing Sheets

(58) Field of Classification Search
USPC .......................................................... 709/224
See application file for complete search history.

(56) References Cited

U.S. PATENT DOCUMENTS

2016/0155175 A1* 6/2016 Isaacson ............ G06Q 30/0635
705/26.43
2018/0181675 A1 6/2018 Lavi et al.
2021/0004841 A1* 1/2021 Yamamoto ............ H04L 67/535

FOREIGN PATENT DOCUMENTS

| JP | 2009145968 A | * | 7/2009 |
| JP | 2013-524366 A | | 6/2013 |
| JP | 2017-068767 A | | 4/2017 |
| JP | 6270085 B1 | * | 1/2018 |
| JP | 2021-022356 A | | 2/2021 |
| JP | 2021-089756 A | | 6/2021 |
| WO | 2012/035644 A1 | | 3/2012 |

OTHER PUBLICATIONS

International Search Report dated Mar. 22, 2022 issued in International Patent Application No. PCT/JP2022/003968, with English translation.

* cited by examiner

| ID | CONDITIONS | | | | | PROCESSING IDENTIFIER |
|---|---|---|---|---|---|---|
| | FIRST CONDITIONS | | SECOND CONDITIONS | | | |
| | FIRST SITE IDENTIFIER | FIRST ATTRIBUTE VALUES | SECOND SITE IDENTIFIER | SECOND ATTRIBUTE VALUES | | |
| 1 | URL1 | SCORE >= 70 | URL2 | STAY TIME ONE MINUTE OR LONGER | | chat(URL2) |
| 2 | URL1 | PURCHASE AMOUNT >= 10,000 YEN & STAY TIME <= 1 MINUTE | URL2 | - | | ADVERTISEMENT OUTPUT (PURCHASE AMOUNT) |
| 3 | URL2 | PURCHASED PRODUCT TYPE = PERSONAL COMPUTER | URL3 | USER TYPE = EXCELLENT | | SECOND MODIFIED PAGE OUTPUT (DISCOUNT PAGE) |
| ... | ... | ... | ... | ... | | ... |

FIG.9

| ID | ESTIMATION CONDITIONS | | PROCESSING CONDITION | PROCESSING IDENTIFIER |
|---|---|---|---|---|
| | FIRST SITE IDENTIFIER | SECOND SITE IDENTIFIER | | |
| 1 | URL1 | URL2 | USER TYPE = EXCELLENT | SECOND MODIFIED PAGE OUTPUT (DISCOUNT PAGE) |
| 2 | URL2 | URL3 | SCORE >= 80 | chat (URL3) |
| ... | ... | ... | ... | ... |

FIG.10

URL2:

| ID | PURCHASE AMOUNT (B) | ADVERTISEMENT |
|---|---|---|
| 1 | 1<=B<=1,000 | file1 |
| 2 | 1,000<B<=3,000 | file2 |
| 3 | 3,000<B<=5,000 | file3 |
| 4 | 5,000<B<=8,000 | file4 |
| 5 | 8,000<B<=10,000 | file5 |
| 6 | 10,000<B<=20,000 | file6 |
| ⋮ | ⋮ | ⋮ |

FIG.11

| ID | SITE IDENTIFIER | COMMUNICATION DESTINATION IDENTIFIER |
|---|---|---|
| 1 | URL1 | ADMINISTRATOR ID=M1 |
| 2 | URL2 | ADMINISTRATOR ID=M2 |
| 3 | URL3 | ADMINISTRATOR ID=M3 |
| ⋮ | ⋮ | ⋮ |

FIG.12

| ID | DATE | FIRST INFORMATION | | SECOND INFORMATION | |
|---|---|---|---|---|---|
| | | FIRST SITE IDENTIFIER | FIRST ATTRIBUTE VALUES | SECOND SITE IDENTIFIER | SECOND ATTRIBUTE VALUES |
| 1 | 4/27 | URL1 | PURCHASE AMOUNT = 0<br>STAY TIME = 1 MINUTE 58 SECONDS<br>SCORE = 72 | URL2 | PURCHASE AMOUNT = 1,280<br>STAY TIME = 1 MINUTE 5 SECONDS<br>USER TYPE = NORMAL |
| 2 | 4/27 | URL1 | PURCHASE AMOUNT = 18,000<br>STAY TIME = 5 MINUTES 10 SECONDS<br>SCORE = 59 | URL2 | PURCHASE AMOUNT = 7,820<br>STAY TIME = 3 MINUTES 10 SECONDS<br>USER TYPE = EXCELLENT |
| 3 | 4/27 | URL2 | PURCHASE AMOUNT = 0<br>STAY TIME = 5 MINUTES<br>USER TYPE = NORMAL | URL3 | SCORE = 38 |
| ⋮ | ⋮ | ⋮ | ⋮ | ⋮ | ⋮ |

FIG.13

PREDETERMINED PROCESSING BASED ON A USER OPERATION PERFORMED ON A WEBSITE

This application is the U.S. National Phase under 35 U.S.C. § 371 of International Patent Application No. PCT/JP2022/003968, filed on Feb. 2, 2022, which in turn claims the benefit of Japanese Patent Application No. 2021-097020, filed on Jun. 10, 2021, the entire disclosures of which Applications are incorporated by reference herein.

TECHNICAL FIELD

The present invention relates to an information processing device or the like that performs predetermined processing based on a user operation performed on a web site.

BACKGROUND ART

Conventionally, there has been an information providing device capable of tracking user behaviors. This information providing device includes an acquisition unit that acquires operation history information indicating a history of operations performed by a user on a terminal device based on access information included in a television broadcast, and terminal identification information that can identify the terminal device; a determination unit that determines the behavior of a user operating the terminal device, based on the operation history information acquired by the acquisition unit; a management unit that writes a result of the determination by the determination unit and the terminal identification information acquired by the acquisition unit in a storage unit in association with each other; and an output unit that outputs information written in the storage unit by the management unit (see Patent Document 1). Note that the access information is information used to access a website including information regarding a store, and the operation history information is information indicating that the website has been accessed based on the access information.

CITATION LIST

Patent Document

Patent Document 1: JP 2017-68767A

SUMMARY OF INVENTION

Technical Problem

With the conventional technique, information indicating that one website has been accessed is used. However, useful processing cannot be performed using operation information on two or more sites.

Solution to Problem

An information processing device according to a first aspect of the present invention is an information processing device including: an operation information reception unit that receives one or more pieces of first operation information regarding a user on a first site, and one or more pieces of second operation information regarding the user on a second site; an attribute value acquisition unit that acquires a first attribute value of the user, using the one or more pieces of first operation information, and acquires a second attribute value of the user, using the one or more pieces of second operation information; and a site processing unit that performs predetermined processing on the first site or the second site, using the first attribute value and the second attribute value.

With such a configuration, useful processing can be performed using operation information regarding at least two sites.

An information processing device according to a second aspect of the present invention is the first aspect of the invention in which, after receiving the one or more pieces of first operation information regarding the user on the first site, the operation information reception unit subsequently receives the one or more pieces of second operation information regarding the user on the second site, the one or more pieces of first operation information include a piece of first operation information that is a designation containing an object identifier of an object designated on the first site, the one or more pieces of second operation information include a piece of second operation information specifying a fact that a jump to the second site has occurred in response to the designation of the object identified by the object identifier, and the attribute value acquisition unit acquires the first attribute value, using the one or more pieces of first operation information corresponding to the object identifier, and acquires the second attribute value, using the one or more pieces of second operation information corresponding to the object identifier.

With such a configuration, appropriate processing can be provided to a user who jumps from the first site to the second site.

An information processing device according to a third aspect of the present invention is the first or the second aspect of the invention in which the site processing unit acquires an advertisement that is to be output on the first site or the second site, using the first attribute value and the second attribute value, and outputs the advertisement to the first site or the second site visited by the user.

With such a configuration, an effective advertisement can be provided to a user, using operation information regarding at least two sites.

An information processing device according to a fourth aspect of the present invention is the first or the second aspect of the invention in which the site processing unit acquires a first modified page modified from a first web page of the first site, or a second modified page modified from a second web page of the second site, using the first attribute value and the second attribute value, and transmits the first modified page or the second modified page to a user terminal of the user.

With such a configuration, a useful web page can be provided to a user, using operation information regarding at least two sites.

An information processing device according to a fifth aspect of the present invention is any one of the first to fourth aspects of the invention, further including a learning information storage unit that stores learning information acquired using a set of a first attribute value and a second attribute value of each of two or more users, in which the attribute value acquisition unit acquires the first attribute value of the user, using the one or more pieces of first operation information, and the site processing unit estimates a second attribute value of the user who has visited the second site from the first site, using the first attribute value of the user and the learning information, and performs predetermined processing on the second site, using the estimated second attribute value.

With such a configuration, it is possible to estimate the attribute values of the user, using learning information acquired using operation information on two or more sites, and provide appropriate processing to the user.

An information processing device according to a sixth aspect of the present invention is any one of the first to fifth aspects of the invention, in which the first attribute value or the second attribute value is a user type.

With such a configuration, a user type can be acquired using operation information regarding at least two sites, and useful processing for the user can be performed using the user type.

Advantageous Effects of Invention

With an information processing device according to the present invention, useful processing can be performed using operation information on at least two sites.

BRIEF DESCRIPTION OF DRAWINGS

FIG. 9 is a diagram showing a dynamic processing information management table according to the same.

FIG. 10 is a diagram showing an estimation condition processing management table according to the same.

FIG. 11 is a diagram showing an advertisement management table according to the same.

FIG. 12 is a diagram showing a management terminal management table according to the same.

FIG. 13 is a diagram showing a user information management table according to the same.

DESCRIPTION OF EMBODIMENTS

Figure 1:
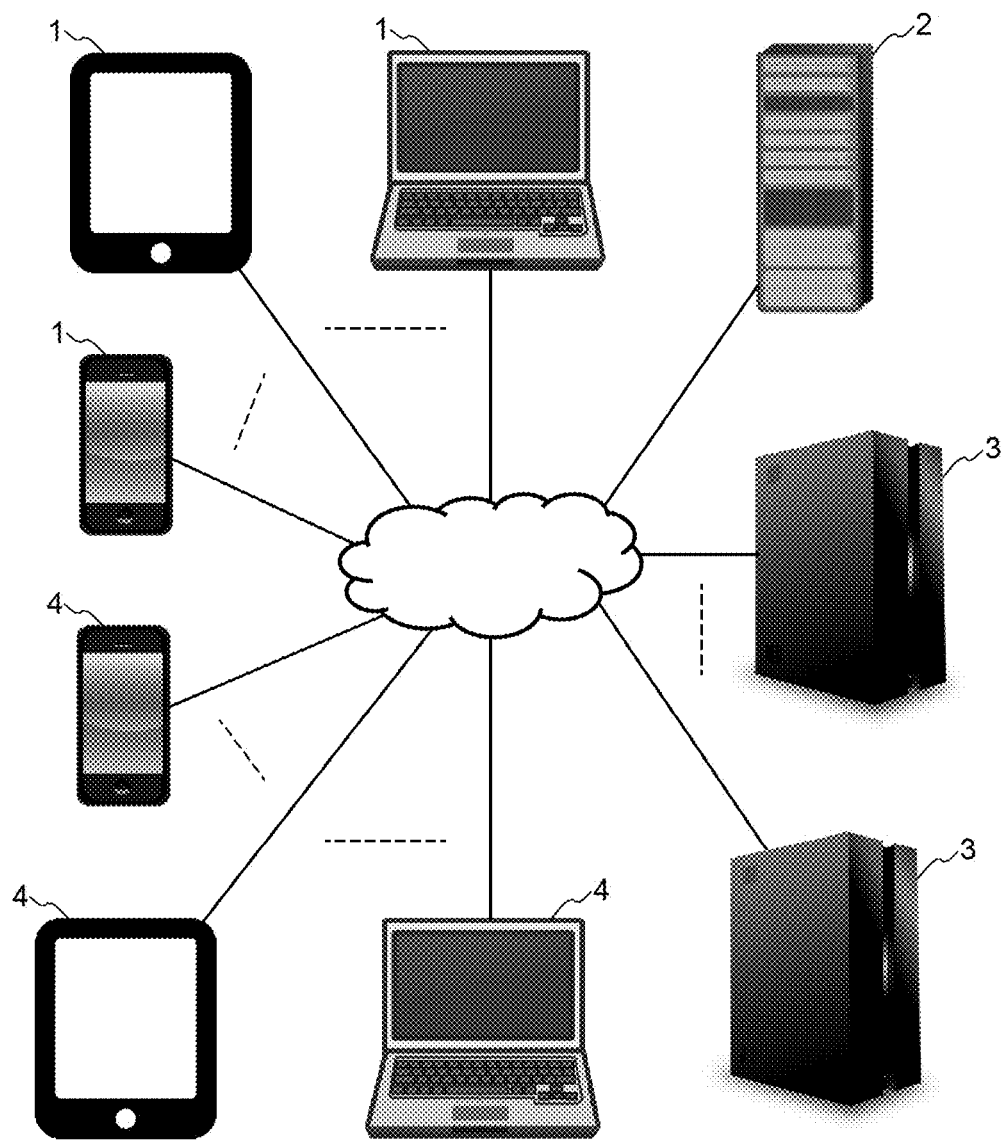
FIG. 1 is a conceptual diagram for an information system A according to a first embodiment.

Hereinafter, an embodiment of an information processing device and so on will be described with reference to the drawings. Note that in the embodiment, constituent elements with the same reference numerals perform similar operations, and therefore, redundant descriptions may be omitted.

First Embodiment

The present embodiment describes an information system including information processing device that performs predetermined processing, using user attribute values acquired using operation information on a first site and user attribute values acquired using operation information on a second site. Note that the predetermined processing includes, for example, processing that is performed to select and output an appropriate advertisement, processing that is performed to predict user attribute value in real time, and perform predetermined processing using the attribute values. Note that the first site and the second site are websites.

FIG. 1 is a conceptual diagram for an information system A according to the present embodiment. The information system A includes one or more user terminals 1, an information processing device 2, one or more web servers 3, and one or more management terminals 4. It is preferable that there are two or more web servers 3.

Each user terminal 1 is a terminal used by a user to access websites in the webservers 3. Each user terminal 1 is, for example, a so-called personal computer, a tablet terminal, a smartphone, or the like, and there is no limitation on the type thereof.

The information processing device 2 is a server that analyzes operation information regarding operations performed by a user on websites, and performs predetermined processing. The information processing device 2 is, for example, an ASP server, a cloud server, or the like. Note that there is no limitation on the type of the information processing device 2. The information processing device 2 may include all the functions of each web server 3.

Each web server 3 is a server that stores websites, and is, for example, an ASP server, a cloud server, or the like. Note that there is no limitation on the type of each web server 3. There are one or more websites. Each website may be a web page. Each website is, for example, an EC site, a site that provides content, or the like, and there is no limitation on the content and type thereof. Each web server 3 is a well-known device.

Each management terminal 4 is a terminal of an administrator that provides services to users, which is, for example, an administrator of a web server 3, or an administrator of the information processing device 2. Each management terminal 4 is, for example, a so-called personal computer, a tablet terminal a smartphone, or the like, and there is no limitation on the type thereof.

The user terminals 1, the information processing device 2, the web servers 3, and the management terminals 4 can typically communicate with each other via a network such as the Internet.

Figure 2:
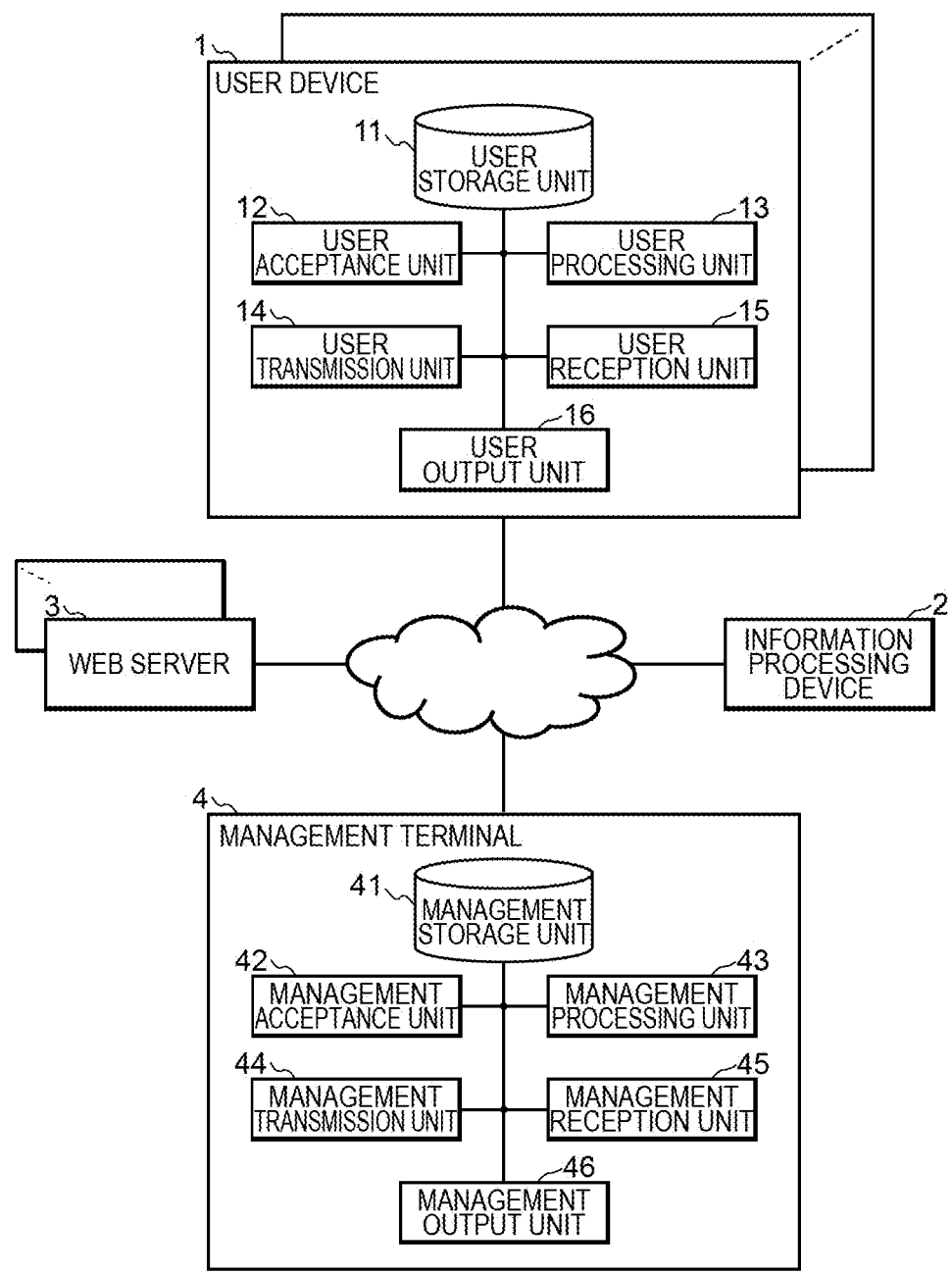
FIG. 2 is a block diagram for the information system A according to the same.
Figure 3:
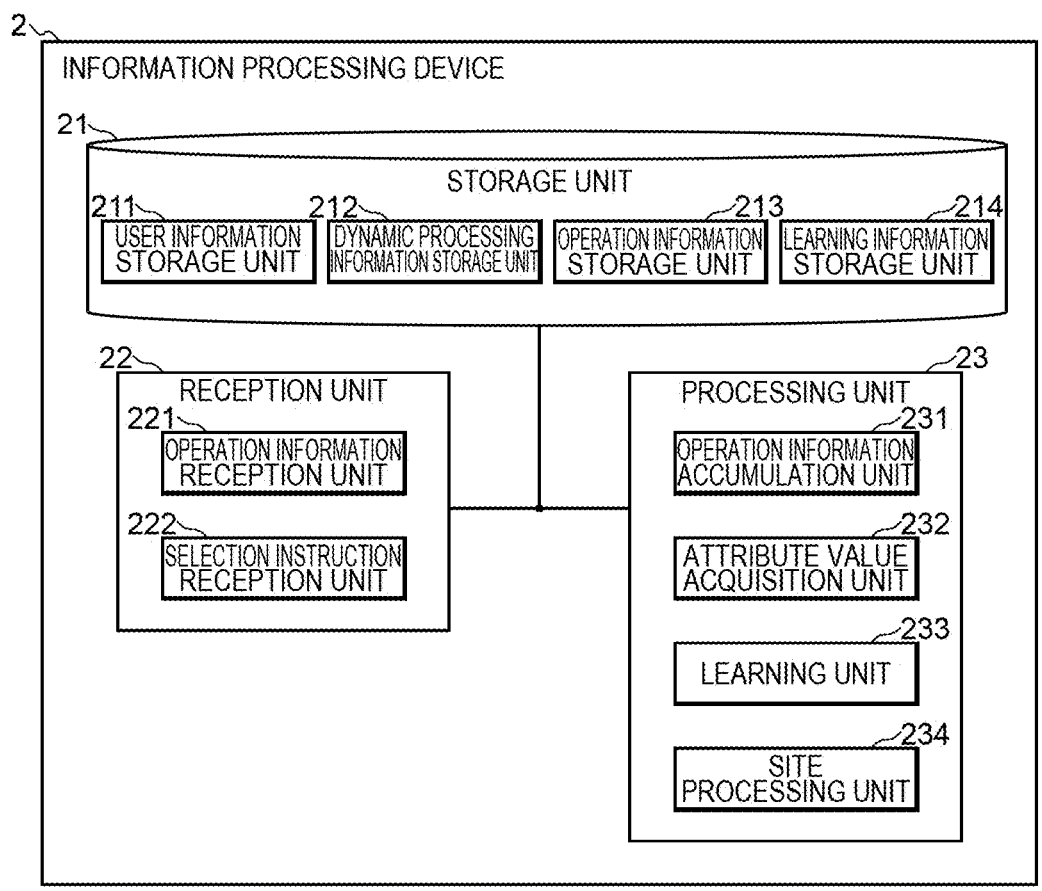
FIG. 3 is a block diagram for an information processing device 2 according to the same.

FIG. 2 is a block diagram for the information system A according to the present embodiment. FIG. 3 is a block diagram for the information processing device 2.

Each user terminal 1 includes a user storage unit 11, a user acceptance unit 12, a user processing unit 13, a user transmission unit 14, a user reception unit 15, and a user output unit 16.

The information processing device 2 includes a storage unit 21, a reception unit 22, and a processing unit 23. The storage unit 21 includes a user information storage unit 211, a dynamic processing information storage unit 212, an operation information storage unit 213, and a learning information storage unit 214. The reception unit 22 includes an operation information reception unit 221 and a selection instruction reception unit 222. The processing unit 23 includes an operation information accumulation unit 231, an attribute value acquisition unit 232, a learning unit 233, and a site processing unit 234.

Each management terminal 4 includes a management storage unit 41, a management acceptance unit 42, a management processing unit 43, a management transmission unit 44, a management reception unit 45, and a management output unit 46.

The user storage unit 11 included in each user terminal 1 stores various kinds of information. Examples of the various kinds of information include a user identifier, a user terminal identifier, user attribute values, and so on. The user identifier is information that identifies a user, and is, for example, an ID. The user identifier may be a telephone number, a credit card number, an email address, or the like. The user terminal identifier is information that identifies the user terminal 1, and is, for example, a cookie ID, a session identifier, an IP address, a MAC address, or the like. The user attribute values are, for example, static attribute values such as the sex and the age of the user.

The user acceptance unit 12 accepts instructions, information, and so on input from the user. Examples of the instructions, information, and so on include operation information. Operation information is information regarding operations performed by the user on websites. Examples of the operation information include information indicating that a button has been pressed, information indicating that an anchor has been specified, information regarding an operation performed to jump to another page, information input in a field, and so on. Operation information contains, for example, the identifier of a designated object. Operation information contains, for example, a click ID. Examples of the operation information include "rightButtonON" (indicating that the right mouse button has been pressed), "click object A" (indicating that the object identified by object A has been clicked), "drug object A" (indicating that the object A has been dragged), "<purchased product ID>123<quantity>3" (indicating that three items identified by 123 have been purchased), "jump http://www.xxx.co.jp" (indicating that the web page specified by the URL "http://www.xxx.co.jp" has been accessed), and so on. The operation information mentioned here is typically primitive operation information, but it is preferable that the operation information is information that allows a user or administrator to see and judge the meaning and significance of the operation. That is to say, there is no limitation on the data structure of the operation information, the granularity of the information, or the like. Operation information is typically information specifying an operation performed by the user, but may also include information regarding processing performed by the information processing device 2 resulting from the user's operation.

Examples of the instructions, information, and so on include strings, voices, images, and so on that are used to communicate with an administrator. Examples of communication include communication by chat, communication by web conference, and so on.

Any input means, such as a touch panel, a keyboard, a mouse, a menu screen, a microphone, a camera, or the like, may be employed to input instructions, information, and so on.

The user processing unit 13 performs various kinds of processing. Examples of the various kinds of processing include processing that is performed to change the instructions, information, and so on accepted by the user acceptance unit 12 into structures of instructions, information, and so on to be transmitted, processing that is performed to change the information received by the user reception unit 15 into structures to be output, and so on.

The user transmission unit 14 transmits various kinds of information, instructions, and so on. Examples of the various kinds of information, instructions, and so on include operation information. The user transmission unit 14 typically transmits information, instructions, and so on to the information processing device 2. However, the user transmission unit 14 may transmit strings, voices, images, and so on, which are pieces of information used to communication with an administrator directly to a management terminal 4. The user transmission unit 14 also transmits operation information to the web servers 3.

In addition to operation information, the user transmission unit 14 may transmit user attribute values. Note that user attributes are stored in the user storage unit 11, examples of which include the sex and the age of the user. The user attributes transmitted here are, for example, static attribute values.

Note that when the user transmission unit 14 transmits operation information or the like to a web server 3, the operation information or the like is transmitted from the web server 3 to the information processing device 2.

The user reception unit 15 receives various kinds of information. Examples of the various kinds of information include a processing result. The processing result is information regarding the result of the processing performed in the web server 3. The processing result is, for example, a destination web page, a panel on which the result of a product purchase instruction is written, an error message, or the like. The various kinds of information are, for example, information for communication input by an administrator. Examples of such information include strings, voices, and images.

The user output unit 16 outputs various kinds of information. Examples of the various kinds of information include information received by the user reception unit 15 and converted by the user processing unit 13 into a structure to be output, such as a processing result.

Here, "output" is typically displaying on a display screen, but may be a concept that encompasses projection using a projector, printing by a printer, the output of a sound, transmission to an external device, accumulation on a recording medium, delivery of a processing result to another processing device or another program, and the like.

The storage unit 21 included in the information processing device 2 stores various kinds of information. Examples of the various kinds of information include user information, which will be described later, dynamic processing information, which will be described later, operation information, estimation conditions, learning conditions, arithmetic expressions used to calculate scores, and approximation conditions, which will be described later.

The estimation conditions are conditions for estimating the second attribute values of the user. The estimation conditions are, for example, conditions regarding the fact that the user has moved from the first site to the second site. Examples of the conditions regarding the fact that the user has moved from the first site to the second site include a condition that the user has moved from the first site to the second site, a condition that any object in the first site has been designated and the user has moved to the second site, a condition that a predetermined object in the first site has been designated and the user has moved to the second site, a condition that the first attribute value acquired from one or more pieces of operation information on the first site satisfies predetermined conditions, and the user has moved from the first site to the second site, and so on. Examples of the estimation conditions include a condition that the first attribute value acquired from one or more pieces of operation information on the first site satisfies a predetermined condition, and the user has moved to the second site from a site that is neither the first site nor the second site. Whether or not such a condition is satisfied is typically judged using operation information.

Note that there are two or more first sites. When there are two or more first sites, the condition regarding the fact that the user has moved from the first sites to the second site is a condition regarding the fact that the user has moved to the second site via all the two or more first sites.

The learning conditions are conditions for the learning unit 233 to acquire learning information. The learning conditions are, for example, time conditions and conditions regarding the amount of data of the accumulated attribute values. Examples of the time conditions include a condition that a predetermined time has been reached, a condition that a predetermined time or more has elapsed since the latest learning information was acquired. Examples of the conditions regarding the amount of data of the accumulated attribute values include a condition that the amount of data of the attribute value has exceeded a threshold value, and the amount of data has increased by a threshold value or more from the attribute value when the latest learning information was acquired.

The user information storage unit 211 stores one or more pieces of user information. Each piece of user information is information regarding a user, and contains one or more attribute values. Each piece of user information contains, for example, one or more first attribute values and one or more second attribute values. Each first attribute value is associated with a first site identifier (for example, a URL or a URI) that identifies the first site. Each second attribute value is associated with a second site identifier (for example, a URL or a URI) that identifies the second site. Each piece of user information may be or may not be information regarding a specified user. A specified user is a user registered in the information processing device 2 according to the user's intention. User information regarding a non-specified user typically does not contain static attribute values.

The one or more attribute values contained in each piece of user information include dynamic attribute values, but may also include static attribute values.

Each static attribute value is usually an invariable attribute value, but may also be regarded as an attribute value that does not change from moment to moment. Examples of static attribute values include a name, an age, an address, a telephone number, a credit card number, an email address, a user terminal identifier, a user identifier, a password, and so on. The user terminal identifier is information that identifies the user terminal 1, and is, for example, a cookie ID, a session identifier, an IP address, a MAC address, or the like. The user identifier is information identifying a user, and is an ID, for example. The user identifier may be a telephone number, a credit card number, an email address, or the like.

Dynamic attribute values are attribute values that can dynamically change according to a user's operation or the like. Examples of dynamic attribute values include real-time dynamic attribute values and history information-using dynamic attribute values. The real-time dynamic attribute values are attribute values that change from moment to moment in real time. Examples of the real-time dynamic attribute values include a stay time on the web page currently viewed by the user, the number of web pages viewed during the current stay, the user type, which will be described later, and so on. The history information utilizing dynamic attribute values are dynamic attribute values that are acquired by also using the history of operation information regarding past visits. Examples of the history information utilizing dynamic attribute values include the number of purchases, the purchase amount, the total purchase amount, the average stay time, the average number of PVs, the number of visits, a score, which will be described later, a user type, which will be described later, and so on.

The dynamic processing information storage unit 212 stores one or more pieces of dynamic processing information. Each piece of dynamic processing information contains conditions and a processing identifier. Each piece of dynamic processing information may also contain information specifying a processing timing. Each piece of dynamic processing information may be embedded in a program, and there is no limitation on the data structure thereof. The conditions here are conditions for performing processing. Here, the conditions are conditions for determining whether or not to perform the processing corresponding to the processing identifier. The conditions are, for example, conditions related to one or more first attribute values of the user. The conditions are, for example, conditions related to one or more second attribute values of the user. The conditions are, for example, conditions related to one or more first attribute values and one or more second attribute values of the user. It is preferable that the first attribute values and the second attribute values included in the conditions include one or more dynamic attribute values. Furthermore, it is preferable that the first attribute values and the second attribute values included in the conditions are conditions using one or more real-time dynamic attribute values or one or more history information utilizing dynamic attribute values. The second attribute values may be estimated attribute values.

Examples of the conditions include "<first attribute value>user type="superior"", <second attribute value>stay time>=threshold", and "<second attribute value>user type="excellent" or "good"". Examples of the processing identifier include an ID, a function name, a method name, the address of the program corresponding to the processing, and so on. The processing identifier may be an executable program. The processing identifier may be any information as long as it is information used to perform the processing corresponding to the conditions. The processing identified by the processing identifier is, for example, processing performed to acquire an advertisement to be output on the second site and transmit the advertisement to the user terminal 1 of a user who is visiting the second site. The processing identified by the processing identifier is, for example, processing performed to acquire a second modified page modified from the second web page of the second site, and transmit the second modified page to the user terminal 1.

The user type is information specifying the type of the user. The user type may be information that is based on a score.

The user type is, for example, information specifying the rank of the user, and is, for example, "initial", "normal", "good", or "excellent". An "initial" user is, for example, a user who visits the corresponding website for the first time. A "normal" user is, for example, a user who visits the corresponding website for the second or subsequent time, and whose score regarding the website is no higher than a first threshold value. A "good" user is, for example, a user who visits the corresponding website for the second or subsequent time, and whose score regarding the website is no lower than the first threshold value and no higher than a second threshold value (the first threshold value<the second threshold value). A "superior" user is, for example, a user who visits the corresponding website for the second or subsequent time, and whose score regarding the website is higher than the second threshold value.

The user type is, for example, information indicating the tendency of user operations, and is, for example, "contemplative type", "normal type", or "speed type". A user of the "contemplative type" is a user whose number of operations per unit time during the stay on the corresponding website is no larger than or smaller than a threshold value X. A user of the "normal type" is a user whose number of operations per unit time during the stay on the corresponding website is larger than or no smaller than the threshold value X, and whose number of operations per unit time during the stay is no larger than a threshold value Y (X<Y) or smaller than the threshold value X. A user of the "speed type" is a user whose number of operations per unit time during the stay on the corresponding website is larger than or no smaller than the threshold value Y.

The processing identifier is information identifying the processing to be performed when the corresponding conditions are satisfied. Examples of the processing identifier include a module name, a function name, and a method name.

The operation information storage unit 213 stores one or more pieces of operation information for each user. The operation information storage unit 213 stores one or more pieces of operation information in association with user identifiers. Each piece of operation information is associated with a site identifier (for example, a URL or an URI). The site identifier is the identifier of a web site. The site identifier may be the identifier of a web page. Each piece of operation information may or may not be associated with a user identifier.

Note that the received operation information and the operation information to be stored in the operation information storage unit 213 may be different. That is to say, the operation information received by the operation information reception unit 221 and the operation information to be stored in the operation information storage unit 213 may have different data structure or the like, for example. For example, the operation information received by the operation information reception unit 221 may be primitive operation information (for example, "rightButtonON"), and the operation information to be stored in the operation information storage unit 213 may be information from which the meaning and significance of the operation can be determined (for example, "xx page has been displayed"). In such a case, the processing unit 23 forms operation information to be stored in the operation information storage unit 213, using the received operation information.

The learning information storage unit 214 stores learning information. Learning information is information acquired using two or more pieces of training data. Each piece of training data is a set of a first attribute value and a second attribute value for each of one or more users. The training data is stored in the storage unit 21. The training data is information acquired and accumulated by the attribute value acquisition unit 232.

The learning information is, for example, a learning model, an arithmetic expression, or a correspondence table. The learning information is information acquired by the learning unit 233, which will be described later. The details of the learning information will be described later.

The reception unit 22 receives various kinds of information, instructions, and so on. Examples of the various kinds of information, instructions, and so on include operation information and a selection instruction.

The operation information reception unit 221 receives one or more pieces of operation information from the user terminal 1 of a user who is a visitor to the website. The operation information reception unit 221 does not need to receive operation information directly from the user terminal 1. The operation information reception unit 221 may receive operation information that is based on information input from the user terminal 1, from a web server 3.

The operation information reception unit 221 receives one or more pieces of first operation information. The operation information reception unit 221 also receives one or more pieces of second operation information. Each piece of first operation information is information regarding an operation performed on the first site. Each piece of second operation information is information regarding an operation performed on the second site. The first site and the second site may be collectively referred to as websites.

The operation information reception unit 221 receives operation information on each of two or more websites.

It is preferable that the operation information reception unit 221 receives one or more pieces of first operation information of a user and subsequently receives second operation information of the user.

In such a case, each of the one or more pieces of first operation information contains, for example, a piece of first operation information that is a designation that contains a click ID specifying a click on the first site, and each of the one or more pieces of second operation information contains the click ID. That is to say, it is preferable that it can be determined from the click ID that a user has performed an operation on the first site and has subsequently visited the second site.

Furthermore, in such a case, the one or more pieces of first operation information include, for example, a piece of first operation information that is a designation that contains the object identifier of the object designated on the first site, and the one or more pieces of second operation information include, for example, a piece of second operation information specifying that a jump to the second site has occurred in response to the designation of the object identified by the object identifier. That is to say, it is preferable that it can be determined from the object ID that a user has performed an operation on the first site and has subsequently visited the second site. The object identifier is, for example, the identifier of an object to be selected. The object may be anything that is selectable, such as an anchor, a button, or a menu item. The object is, for example, an object that has advertising information.

The selection instruction reception unit 222 selects a selection instruction from a management terminal 4. The selection instruction is an instruction to select a user. The selection instruction typically contains a user identifier. The selection instruction may contain a user terminal identifier. The selection instruction need only contain information that enables the administrator to specify the user with whom the administrator communicates.

Note that details of the operation of each management terminal 4 will be described later. For example, each management terminal 4 receives and outputs one or more attribute values output by the site processing unit 234 for each of two or more users.

The processing unit 23 performs various kinds of processing. The various kinds of processing include the processing that is performed by the operation information accumulation unit 231, the attribute value acquisition unit 232, the learning unit 233, and the site processing unit 234.

For example, the processing unit 23 constantly acquires information regarding browsing by the user visiting a website. Examples of information regarding browsing include the length of stay on a website or web page, the number of pages viewed, and so on. That is to say, for example, the processing unit 23 constantly measures the stay time of the user visiting a website on the site or web page, based on the received operation information. However, the processing unit 23 may receive from a web server 3 the stay time of a user visiting a website, on the site or a web page.

For example, the processing unit 23 updates the dynamic attribute values of the user, based on the received operation information.

For example, upon receiving a selection instruction, the processing unit 23 supports communication between the user terminal 1 and the management terminal 4 corresponding to the selection instruction. Communication support includes, for example, providing a place for chatting and a place for a web conference. Communication support is a publicly known technology, and therefore the detailed description thereof will be omitted.

For example, the processing unit 23 transmits the received operation information or the acquired attribute values or user information to the management terminal 4 of the corresponding website. In such a case, the identifier (for example, the IP address or the MAC address) of the management terminal 4 is managed in association with the identifier of the website, and the information processing device 2 and the management terminal 4 are in a communicable state. Note that the corresponding website is the website that the user is currently visiting.

The operation information accumulation unit 231 accumulates the operation information received by the operation information reception unit 221 in the operation information storage unit 213.

For example, the operation information accumulation unit 231 accumulates the operation information in the operation information storage unit 213 in association with the click ID or the object identifier of the object designated when the user leaves the site or the object identifier of the object designated on the previously visited website when the user enters the website.

The operation information accumulation unit 231 accumulates the operation information received by the operation information reception unit 221 in the operation information storage unit 213, in pair with the user identifier. In such a case, the operation information to be received is associated with the user identifier. Note that pairing with the user identifier may be pairing with the user terminal identifier.

The attribute value acquisition unit 232 acquires first attribute values of a user, using one or more pieces of operation information resulting from operations performed by the user on a website. For example, the attribute value acquisition unit 232 acquires first attribute values of a user, using one or more pieces of first operation information, and acquires second attribute values of the user, using one or more pieces of second operation information. The first attribute values are attribute values of the user on the first site. The second attribute values are attribute values of the user on the second site. The first attribute values and the second attribute values are collectively referred to as attribute values as appropriate.

It is preferable that the attribute value acquisition unit 232 acquires the first attribute values, using one or more pieces of first operation information corresponding to a click ID, and acquires the second attribute values, using one or more pieces of second operation information corresponding to the click ID.

The attribute value acquisition unit 232 may acquire the first attribute values, using one or more pieces of first operation information corresponding to an object identifier, and acquires the second attribute values, using one or more pieces of second operation information corresponding to the object identifier.

That is to say, the attribute value acquisition unit 232 typically acquires one or more attribute values of a user who has visited each of two or more websites, for each web site. It is preferable that the attribute value acquisition unit 232 acquires the attribute values of the user who has visited the website during the visit to the website.

Here, the one or more attribute values may include the above-described static attribute values and dynamic attribute values. The attribute value acquisition unit 232 acquires one or more attribute values of a user visiting a website, using the received one or more pieces of operation information. For example, the attribute value acquisition unit 232 acquires one or more static attribute values from the user information storage unit 211. For example, the attribute value acquisition unit 232 acquires a user identifier corresponding to the received operation information, and acquires static attribute values paired with the user identifier from the user information storage unit 211.

It is preferable that the attribute value acquisition unit 232 acquires one or more attribute values that are of a user visiting a website, and are characteristic enough to satisfy predetermined conditions when compared with one or more attribute values of another user. Here, the predetermined conditions that can be satisfied are, for example, that (1) the percentage of people who have the same attribute values as the attribute values of the user is no larger than or smaller than a threshold value, (2) there is no other person who has the same attribute values, (3) the number of people who have the same attribute values as the attribute values of the user is no larger than or smaller than a threshold value, (4) the user has the same attribute values as the pre-stored attribute values, and so on.

For example, for a user, the attribute value acquisition unit 232 calculates a score of the user, using one or more attribute values of the user and two or more pieces of information of one or more pieces of operation information received by the operation information reception unit 221 from the user terminal 1 of the user. Such a score is also an attribute value.

For example, the attribute value acquisition unit 232 calculates a score, using a function that has, as parameters, one or more pieces of information out of the stay time on a website (or a web page), the number of purchases, the purchase amount, the total purchase amount, the number of PVs, the average stay time, and the number of visits, acquired by the attribute value acquisition unit 232. Note that the score is, for example, information indicating the degree of importance of the user from the perspective of the administrator. Note that the number of PVs is the number of page views. Such a function is an increasing function, for example, but there is no limitation. That is to say, for example, the attribute value acquisition unit 232 calculates a score, using a decreasing function that has, as parameters, the elapsed time since the previous visit. Alternatively, instead of a function, the attribute value acquisition unit 232 may use a correspondence table containing conditions that employ one or more parameters such as the stay time, the number of purchases, the purchase amount, the total purchase amount, the number of PVs, the average stay time, the number of visits, and so on, and scores. There is no limitation on the method or algorithm by which the attribute value acquisition unit 232 acquires a score. Note that the score is, for example, information indicating the degree of importance of the user from the perspective of the administrator.

For example, the attribute value acquisition unit 232 acquires a user type, using one or more pieces of information out of the stay time on a website, the number of purchases, the purchase amount, the total purchase amount, the number of PVs, the average stay time, and the number of visits, acquired by the attribute value acquisition unit 232. The user type is information that specifies the rank of the user, and is "initial", "normal", "good", or "excellent", and "contemplative type", "normal type", or "speed type", for example.

For example, if the score of the user is no higher than the first threshold value or lower than the first threshold value, the attribute value acquisition unit 232 acquires the user type "normal". For example, if the score of the user is no lower than the first threshold value or higher than the first threshold value, and is no higher than the second threshold value (the first threshold value<the second threshold value) or lower than the second threshold value, the attribute value acquisition unit 232 acquires the user type "good". For example, if the score of the user is no lower than the second threshold value or higher than the second threshold value, the attribute value acquisition unit 232 acquires the user type "excellent".

For example, if the number of operations per unit time during the stay on a website is no larger than or smaller than the threshold value X, the attribute value acquisition unit 232 acquires the user type "contemplative type". If the number of operations per unit time during the stay on a website is larger than or no smaller than the threshold value X, and the number of operations per unit time during the stay is no larger than the threshold value Y (X<Y) or smaller than the threshold value X, the attribute value acquisition unit 232 acquires the user type "normal". For example, if the number of operations per unit time during the stay on a website is larger than or no smaller than the threshold value Y, the attribute value acquisition unit 232 acquires the user type "speed type".

The attribute value acquisition unit 232 typically accumulates the acquired attribute values in the storage unit 21 in association with the website. For example, the attribute value acquisition unit 232 stores the acquired attribute values in the storage unit 21 in association with the click ID or object identifier contained in operation information. It is preferable that the attribute value acquisition unit 232 accumulates one or more first attribute values and one or more second attribute values that have the same click ID or object identifier and are based on consecutive pieces of operation information in association with each other. Alternatively, the attribute value acquisition unit 232 may accumulates the acquired attribute values in the storage unit 21 in association with the user identifier. This user identifier is the user identifier associated with the operation information on which the attribute values are based.

The learning unit 233 acquires learning information acquired using two or more pieces of training data. Each piece of training data is a pair of a first attribute value and a second attribute value for each of one or more users. Each piece of training data is a set of one or more first attribute values and one or more second attribute values for each of one or more users. It is preferable that each piece of training data is a set of one or more first attribute values and one second attribute value for each of one or more users. The training data is stored in the storage unit 21.

The learning information is, for example, a learning model, an arithmetic expression, or a correspondence table. Hereinafter, the details of processing performed by the learning unit 233 to acquire learning information will be described for each case.

(1) When Learning Information is a Learning Model

The learning unit 233 performs machine learning processing on two or more pieces of training data to acquire a learning model. Note that machine learning is, for example, deep learning, random forest, decision tree, SVM, or SVR, but there is no limitation on the algorithm thereof.

More specifically, the learning unit 233 provides two or more pieces of training data to a module that performs machine learning processing, and executes the module to acquire a learning model. The module is, for example, a TensorFlow module, an R language random forest module, TinySVM, or the like, and there is no limitation.

(2) When Learning Information is an Arithmetic Expression

The learning unit 233 performs a regression analysis on two or more pieces of training data, and acquires an arithmetic expression that takes one or more first attribute values as input and a second attribute value as an output. Note that the regression analysis is, for example, a linear regression analysis, but may also be a nonlinear regression analysis. There is no limitation on the algorithm of the regression analysis. The regression analysis is a known technique, and therefore the detailed description thereof will be omitted. It is preferable that a single second attribute value is output from the arithmetic expression. For example, the second attribute value output from the arithmetic expression is a score or a user type.

(3) When Learning Information is a Correspondence Table

The learning unit 233 acquires a correspondence table that contains correspondence information that is two or more pieces of training data. Correspondence information is information specifying the correspondence between one or more first attribute values and one or more second attribute values. It is preferable that a single second attribute value is contained in the correspondence information. For example, the second attribute value output from the arithmetic expression is a score or a user type.

The site processing unit 234 performs predetermined processing on the second site, using one or more first attribute values and one or more second attribute values. The site processing unit 234 may perform predetermined processing on the first site, using one or more first attribute values and one or more second attribute values. Note that the predetermined processing is, for example, processing identified by a processing identifier, which will be described later.

For example, the site processing unit 234 determines a condition satisfied by one or more first attribute values and one or more second attribute values, from the dynamic processing information storage unit 212, acquires a processing identifier corresponding to the condition, and performs processing identified by the processing identifier.

The processing identified by a processing identifier is, for example, a processing performed to acquire a specific advertisement and outputs the advertisement to the second site that is visited by a user.

The processing identified by the processing identifier is, for example, processing performed to acquire a second modified page modified from the second web page of the second site, and transmit the second modified page to the user terminal 1. This user terminal 1 is a terminal of a user corresponding to the first attribute values. It is preferable that such processing is performed on the user terminal 1 of the user during the visit to the second site.

For example, the site processing unit 234 acquires an advertisement to be output on the first site or the second site, using one or more first attribute values and one or more second attribute values, and outputs the advertisement to the first site or the second site visited by the user. This processing is performed to output the advertisement acquired using the first attribute values and the second attribute values acquired using at least the operation information of previous visits when the user revisits the first site or the second site. Note that the processing performed to output an advertisement is typically processing to transmit an advertisement to the user terminal 1.

For example, the site processing unit 234 acquires the first modified page modified from the first web page of the first site or the second modified page modified from the second web page of the second site, using one or more first attribute values and one or more second attribute values, and transmits the first modified page or the second modified page to a user terminal 1. This processing is performed to transmit the first modified page or the second modified page to the user terminal 1 of the user when the user visits the first site or the second site.

For example, the site processing unit 234 judges whether or not the one or more first attribute values or the one or more second attribute values match a communication condition, and if they match, the site processing unit 234 performs processing to start communication between the user terminal 1 of the user and the management terminal 4. The communication is, for example, a chat or a web conference. Communication between the user terminal 1 and the management terminal 4 can be started by such processing performed to start communication. This processing is based on a known technique.

For example, the site processing unit 234 estimates the second attribute values of a user, using the first attribute values of the user who has visited the second site from the first site, and learning information, and performs predetermined processing on the second site, using the estimated second attribute values. The method for estimating the second attribute value differs for three types of learning information. Hereinafter, three types of methods for estimating the second attribute value. The predetermined processing will be described later.

(1) When Learning Information is a Learning Model

The site processing unit 234 performs machine learning prediction processing, using the acquired one or more first attribute values and the learning model in the learning information storage unit 214, to acquire the second attribute values. Note that machine learning is, for example, deep learning, random forest, decision tree, SVM, or SVR, but there is no limitation on the algorithm thereof.

More specifically, the site processing unit 234 provides one or more first attribute values and the learning model to a module that performs machine learning prediction processing and executes the module to acquire a second attribute value. The module is, for example, a TensorFlow module, an R language random forest module, TinySVM, or the like, and there is no limitation.

(2) When Learning Information is an Arithmetic Expression

The site processing unit 234 provides the acquired one or more first attribute values to the arithmetic expression in the learning information storage unit 214, and executes the arithmetic expression to acquire the second attribute value. The second attribute value is, for example, a score, but there is no limitation.

(3) When Learning Information is a Correspondence Table

For example, the site processing unit 234 searches the correspondence table in the learning information storage unit 214 for a set of first attribute values of a piece of correspondence table that is most similar to the acquired one or more first attribute values, and acquires the second attribute value that is paired with the set from the correspondence table.

For example, the site processing unit 234 searches the correspondence table in the learning information storage unit 214 for a set of first attribute values of one or more pieces of correspondence information that match the approximation condition with respect to the acquired one or more first attribute values, and acquires an estimated value of the second attribute value of the user, using the second attribute values contained in the one or more pieces of correspondence information. Note that the estimated value of the second attribute value is a representative value of the second attribute values contained in the one or more pieces of correspondence information. The representative value is, for example, an average value, a median value, or a weighted average value. The weighted average value is a value acquired by assigning a large weight as the distance (vector distance) between one or more first attribute values and the one or more first attribute values contained in the corresponding information decreases.

The approximation condition is, for example, that the distance between the vector whose elements are the acquired two or more first attribute values and the vector whose elements are the two or more first attribute values contained in the corresponding information is within a threshold value or smaller than the threshold value. The approximation condition is, for example, that the distance is in the top N (N is a natural number).

For example, the site processing unit 234 performs predetermined processing, using the estimated second attribute values. The predetermined processing is, for example, process that is performed to acquire an advertisement corresponding to the estimated second attribute values and transmit the advertisement to the user terminal 1. The predetermined processing is, for example, processing performed to acquire a second modified page modified from the second web page of the second site, based on the estimated second attribute values, and transmit the second modified page to the user terminal 1. The predetermined processing is, for example, processing that is performed to start communication with the management terminal 4. The communication is, for example, a chat, a web conference, or the like. The processing performed to start communication may be processing that is performed to inquire of the management terminal 4 whether or not to communicate with the user in order to acquire permission to start communication.

Each web server 3 is a server that stores websites. Each web server 3 is, for example, a server that stores the first website or the second website. The websites are, for example EC sites.

The management storage unit 41 included in each management terminal 4 stores various kinds of information. Examples of the various kinds of information include an administrator identifier identifying the administrator.

The management acceptance unit 42 accepts various kinds of instructions, information, and so on. Examples of the various kinds of instructions and information include a selection instruction, dynamic processing information, strings, audio, images, and so on used for communication with users.

Any input means, such as a touch panel, a keyboard, a mouse, a menu screen, a microphone, a camera, or the like, may be employed to input various kinds of instructions, information, and so on. The management acceptance unit 42 can be realized using a device driver for input means such as a touch panel, a keyboard, or the like, or control software for a menu screen, or the like.

The management processing unit 43 performs various kinds of processing. Examples of the various kinds of processing include processing that is performed to convert instructions, information or the like accepted by the management acceptance unit 42 into a data structure to be transmitted, processing that is performed to convert information received by management reception unit 45 into a data structure to be output, and so on.

The management transmission unit 44 transmits various kinds of instructions, information, and so on. The management transmission unit 44 typically transmits various kinds of instructions, information, and so on to the server device 2. Examples of the various kinds of instructions, information, and so on include a selection instruction and dynamic processing information.

The management reception unit 45 receives various kinds of information. The management reception unit 45 typically receives various kinds of information from the information processing device 2. Examples of the various kinds of information include one or more attribute values of each user and thumbnail images.

The management output unit 46 outputs various kinds of information. Examples of the various kinds of information include one or more attribute values of each user and thumbnail images.

It is preferable that the user storage unit 11, the storage unit 21, the user information storage unit 211, the dynamic processing information storage unit 212, the operation information storage unit 213, the learning information storage unit 214, and the management storage unit 41 are realized using a non-volatile recording medium, but they may be realized using a volatile recording medium.

There is no limitation on the process in which information is stored in the user storage unit 11 and so on. For example, information may be stored in the user storage unit 11 or the like via a recording medium, or information transmitted via a communication line or the like may be stored in the user storage unit 11 or the like, or information input via an input device may be stored in the user storage unit 11 or the like.

The user acceptance unit 12 and the management acceptance unit 42 can be realized using a device driver for input means such as a touch panel, a keyboard, or the like, or control software for a menu screen, or the like.

The user processing unit 13, the processing unit 23, the operation information accumulation unit 231, the attribute value acquisition unit 232, the learning unit 233, the site processing unit 234, and the management processing unit 43 can typically be realized using a processor, a memory, and so on. The processing procedures performed by the user processing unit 13 and so on are typically realized using software, and the software is recorded on a recording medium such as a ROM. However, such processing procedures may be realized using hardware (a dedicated circuit). The processor is, for example, a CPU, an MPU, a GPU, or the like, and there is no limitation.

The user transmission unit 14, the site processing unit 234, and the management transmission unit 44 may typically be realized using a wireless or wired communication means.

The user reception unit 15, the reception unit 22, the operation information reception unit 221, the selection instruction reception unit 222, and the management reception unit 45 are typically realized using a wireless or wired communication means.

The user output unit 16 and the management output unit 46 may be regarded as including or not including an output device such as a display or a speaker. The user output unit 16 and so on can be realized using the driver software of the output device, the driver software of the output device and the output device, or the like.

Next, examples of operations of the information system A will be described. First, examples of operations of a user terminal 1 will be described with reference to the flowchart in FIG. 4.

(Step S401) The user acceptance unit 12 judges whether or not an operation has been accepted from a user. If an operation has been accepted, processing proceeds to step S402, and if an operation has not been accepted, processing proceeds to step S406.

(Step S402) The user processing unit 13 forms operation information based on the operation accepted in step S401.

(Step S403) The user transmission unit 14 transmits the operation information formed in step S402 to a web server 3. Note that the user transmission unit 14 may also transmit the operation information to the information processing device 2. Note that the operation information may be transmitted to the information processing device 2 via a web server 3.

(Step S404) The user reception unit 15 judges whether or not a processing result corresponding to the operation information has been received from the web server 3. If a processing result has been received, processing proceeds to step S405, and if a processing result has not been received, processing returns to step S404.

(Step S405) The user output unit 16 outputs the processing result received in step S404. Processing returns to step S401.

(Step S406) The user reception unit 15 judges whether or not information has been received from the information processing device 2 or the management terminal 4. If information has been received, processing proceeds to step S411, and if information has not been received, processing returns to step S401. Note that this information is, for example, the result of processing in the information processing device 2, and is, for example, an advertisement, a coupon, a message, or a modified web page. Alternatively, this information is, for example, information regarding communication such as a chat or a web conference with the administrator using the management terminal 4. Examples of information regarding communication include strings input by the administrator, the administrator's voice, images, or the like. Note that the images are images taken with a camera.

(Step S407) The user processing unit 13 forms information to be output, using the information received in step S406. The user output unit 16 outputs the information. Processing returns to step S401.

Figure 4:
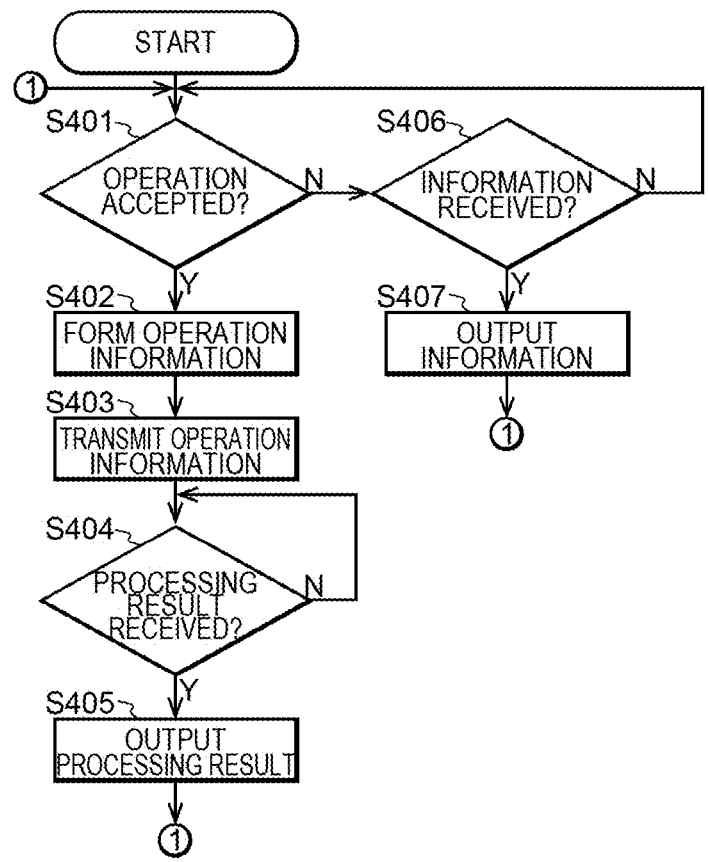
FIG. 4 is a flowchart illustrating operations of a user terminal 1 according to the same.

In the flowchart in FIG. 4, in a case where the administrator of the management terminal 4 and the user communicate with each other, the processing performed to receive an input from the user and transmit it to the management terminal 4 continues until the communication is terminated.

In the flowchart shown in FIG. 4, processing is terminated when power is turned off or an interruption is made to terminate the processing.

Next, examples of operations of the information processing device 2 will be described with reference to the flowchart in FIG. 5.

(Step S501) The operation information reception unit 221 judges whether or not operation information has been received. If operation information has been received, processing proceeds to step S502, and if operation information has not been received, processing proceeds to step S506. Note that operation information is received in association with a site identifier. Alternatively, operation information may be associated with a user identifier. The operation information reception unit 221 receives operation information from the user terminal 1 or the web server 3.

(Step S502) The operation information accumulation unit 231 accumulates the operation information received in step S501 in the operation information storage unit 213 in association with site identifiers. Note that the received operation information and the operation information to be accumulated may be different from each other in the data structure, the granularity of the information, and so on.

(Step S503) The attribute value acquisition unit 232 judges whether or not attribute values can be acquired. If attribute values can be acquired, processing proceeds to step S504, and if attribute values cannot be acquired, processing returns to step S501. Note that, for example, the attribute value acquisition unit 232 uses one or more pieces of operation information, including the operation information accumulated in step S502, to judge whether or not attribute values can be acquired. It is preferable that the attribute value acquisition unit 232 acquires attribute values that can be acquired or updated at any time, such as the stay time on the web page currently viewed by the user, and accumulates them in the user information storage unit 211.

(Step S504) The attribute value acquisition unit 232 acquires one or more attribute values of the user. The attribute value acquisition unit 232 typically uses one or more pieces of operation information, including the operation information accumulated in step S502, to acquire the attribute values.

(Step S505) The attribute value acquisition unit 232 accumulates the one or more pieces of attribute values acquired in step S504 in the storage unit 21. Processing returns to step S501. Note that the attribute value acquisition unit 232 accumulates one or more attribute values in association with, for example, a click ID included in the operation information, an object identifier included in the operation information, or a user identifier corresponding to the operation information.

Note that the received operation information is associated with a user identifier, the attribute value acquisition unit 232 accumulates the one or more attribute values in the user information storage unit 211 in association with the user identifier.

(Step S506) The site processing unit 234 judges whether or not one or more pieces of operation information, including the operation information received in step S501, satisfies estimation conditions. If the estimation conditions are satisfied, the processing proceeds to step S507, and if the estimation conditions are not satisfied, the processing proceeds to step S511. The judgment regarding whether or not one or more pieces of operation information satisfy the estimation conditions may be judgment regarding whether or not the one or more attribute values acquired in step S504 satisfy the estimation conditions. This is because the attribute values are based on the operation information.

(Step S507) The site processing unit 234 acquires one or more first attribute values, using one or more pieces of operation information of the user on the first site. Note that such processing may be performed by the attribute value acquisition unit 232. If the estimation conditions are conditions related to the user moving from the first site to the second site, it is preferable that the site processing unit 234 uses the one or more pieces of operation information of the user on the first site immediately before moving to the second site, to acquire one or more first attribute values. The one or more first attribute values are, for example, one or more attribute values out of the user type; the score; and the stay time of the user on the first site.

(Step S508) The site processing unit 234 acquires the learning information in the learning information storage unit 214.

(Step S509) The site processing unit 234 acquires estimated second attribute values, using the one or more first attribute values acquired in step S507 and the learning information acquired in step S508. Note that, here, the site processing unit 234 may acquire two or more second attribute values, using two or more pieces of learning information.

(Step S510) The site processing unit 234 performs estimated attribute value processing, using the one or more second attribute values acquired in step S509. An example of estimated attribute value processing will be described with reference to the flowchart in FIG. 6. Processing returns to step S501. Note that estimated attribute value processing is processing corresponding to the estimated one or more second attribute values.

(Step S511) The learning unit 233 judges whether or not a learning condition is satisfied. If the learning condition is satisfied, processing proceeds to step S512, and if the learning condition is not satisfied, processing proceeds to step S514.

(Step S512) The learning unit 233 acquires two or more pieces of training data stored in the storage unit 21.

(Step S513) The learning unit 233 acquires learning information, using the two or more pieces of training data acquired in step S512.
Processing Returns to Step S501.

(Step S514) The site processing unit 234 performs site processing. An example of site processing will be described with reference to the flowchart in FIG. 7. Processing returns to step S501.

Figure 5:
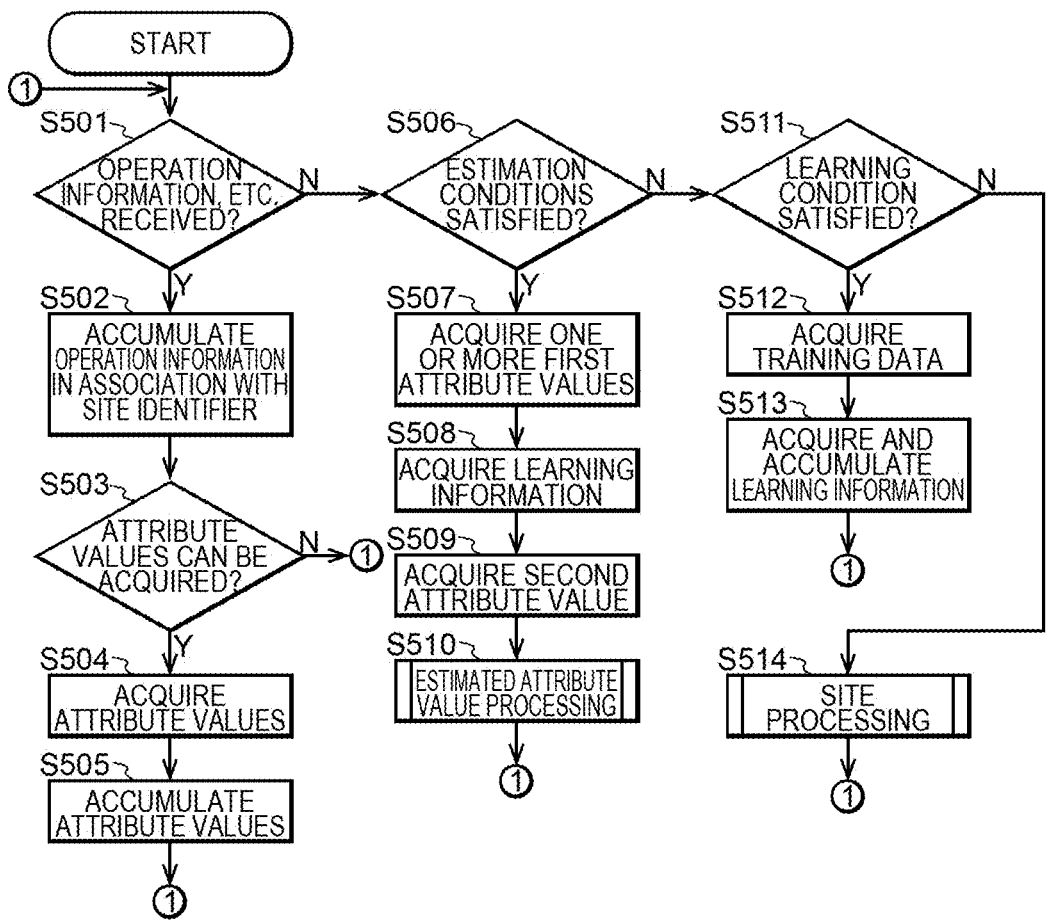
FIG. 5 is a flowchart illustrating examples of operations of the information processing device 2 according to the same.

In the flowchart in FIG. 5, it is preferable that the processing unit 23 transmits the received operation information or the acquired attribute values or user information to the management terminal 4 of the corresponding website.

In the flowchart shown in FIG. 5, processing is terminated when power is turned off or an interruption is made to terminate the processing.

Figure 6:
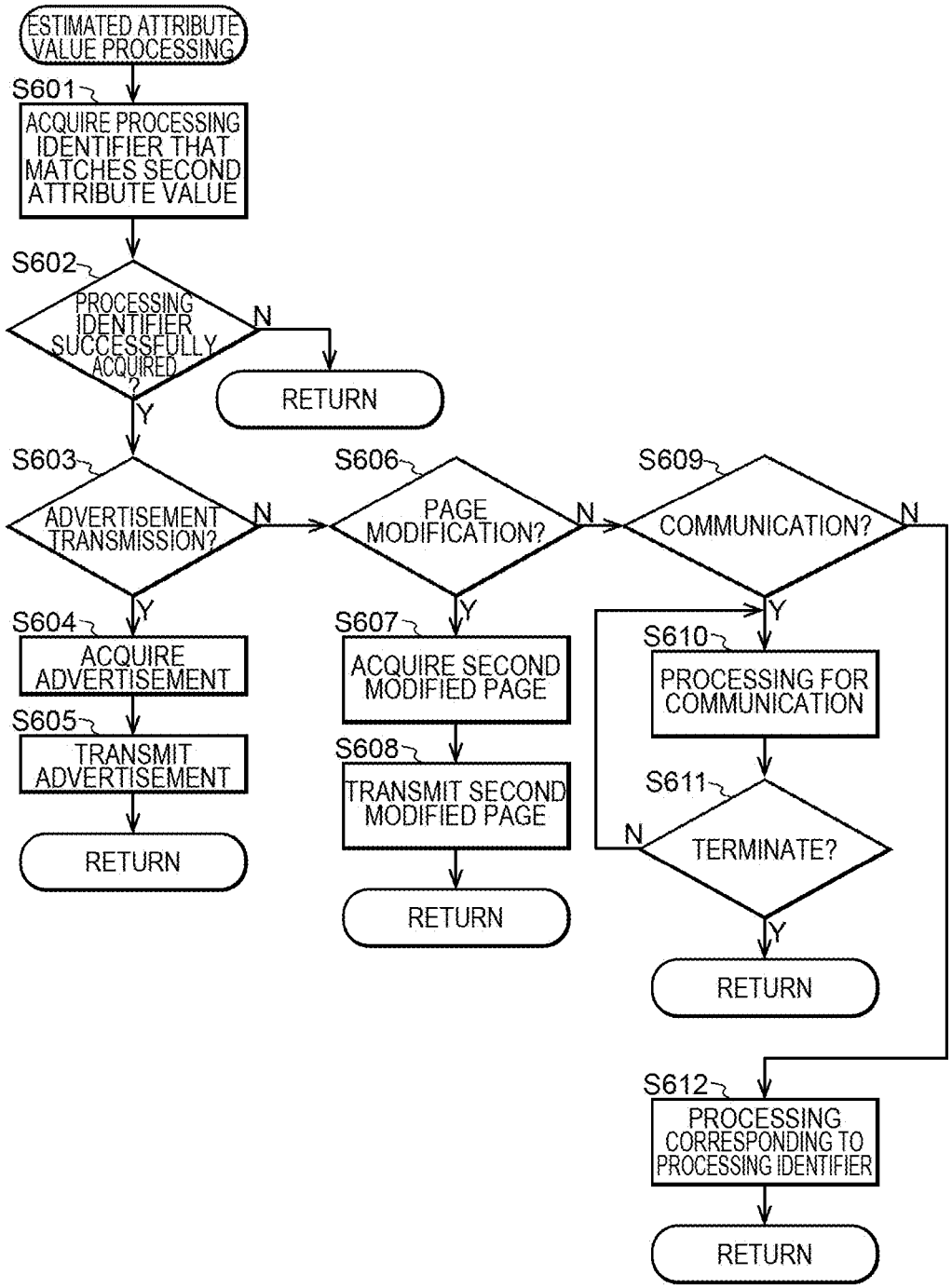
FIG. 6 is a flowchart illustrating an example of estimated attribute value processing according to the same.

Next, an example of the estimated attribute value processing in step S510 will be described with reference to the flowchart in FIG. 6.

(Step S601) The site processing unit 234 searches the dynamic processing information storage unit 212 for a condition that matches the one or more second attribute values acquired in step S509. The site processing unit 234 acquires a processing identifier that is paired with the condition that matches the one or more second attribute values, from the dynamic processing information storage unit 212. Here, there may be cases where the processing identifier has not been acquired.

(Step S602) The site processing unit 234 judges whether or not a processing identifier has been successfully acquired in step S601. If a processing identifier has been successfully acquired, processing proceeds to step S603, and if a processing identifier has not been successfully acquired, processing returns to higher level processing.

(Step S603) The site processing unit 234 judges whether or not the processing identifier acquired in step S602 is the identifier of processing that is performed to transmit an advertisement. If the processing identifier is the identifier of processing that is performed to transmit an advertisement, processing proceeds to step S604, and if the processing identifier is not the identifier of processing that is performed to transmit an advertisement, processing proceeds to step S606.

(Step S604) The site processing unit 234 acquires an advertisement. It is preferable that the site processing unit 234 acquires an advertisement corresponding to the second attribute values. For example, the site processing unit 234 acquires an advertisement from the storage unit 21, the web server 3, or a device that is not illustrated.

(Step S605) The site processing unit 234 transmits the advertisement acquired in step S604 to the user terminal 1. Processing returns to higher level processing. Note that such a user terminal 1 is the user terminal 1 of the user who performed the operation on which the operation information is based.

(Step S606) The site processing unit 234 judges whether or not the processing identifier acquired in step S602 is the identifier of processing that is performed to modify a page. If the processing identifier is the identifier of processing that is performed to modify a page, processing proceeds to step S607, and if the processing identifier is not the identifier of processing that is performed to modify a page, the processing proceeds to step S609.

(Step S607) The site processing unit 234 acquires the second modified page modified from the second page of the second site. Note that the second modified page is typically present in the storage unit 21, but may be present in the web server 3 or a device that is not illustrated. The second modified page is typically a page formed by modifying part of the content of the second page, but be a page that is completely different from the second page.

(Step S608) The site processing unit 234 transmits the second modified page acquired in step S607 to the user terminal 1. Processing returns to higher level processing.

Note that such a user terminal 1 is the user terminal 1 of the user who performed the operation on which the operation information is based. For example, the user terminal 1 outputs the second modified page instead of the second page. For example, the user terminal 1 outputs the second modified page in addition to the second page. For example, the user terminal 1 may output the second modified page superimposed on the second page.

(Step S609) The site processing unit 234 judges whether or not the processing identifier acquired in step S602 is the identifier of processing for communication. If the processing identifier is the identifier of processing for communication, processing proceeds to step S610, and if the processing identifier is not the identifier of processing for communication, processing proceeds to step S612.

(Step S610) The site processing unit 234 performs processing that allows the user of the user terminal 1 and the administrator of the management terminal 4 to communicate with each other.

(Step S611) The site processing unit 234 judges whether or not to terminate communication. If communication is to be terminated, processing returns to high level processing, and if communication is not to be terminated, processing returns to step S610. Communication is to be terminated when an instruction to terminate is received from the user terminal 1 or the management terminal 4. It is preferable that, when communication is to be terminated, the site processing unit 234 performs various kinds of processing to terminate the communication.

(Step S612) The site processing unit 234 performs processing corresponding to the processing identifier. Processing returns to higher level processing.

Figure 7:
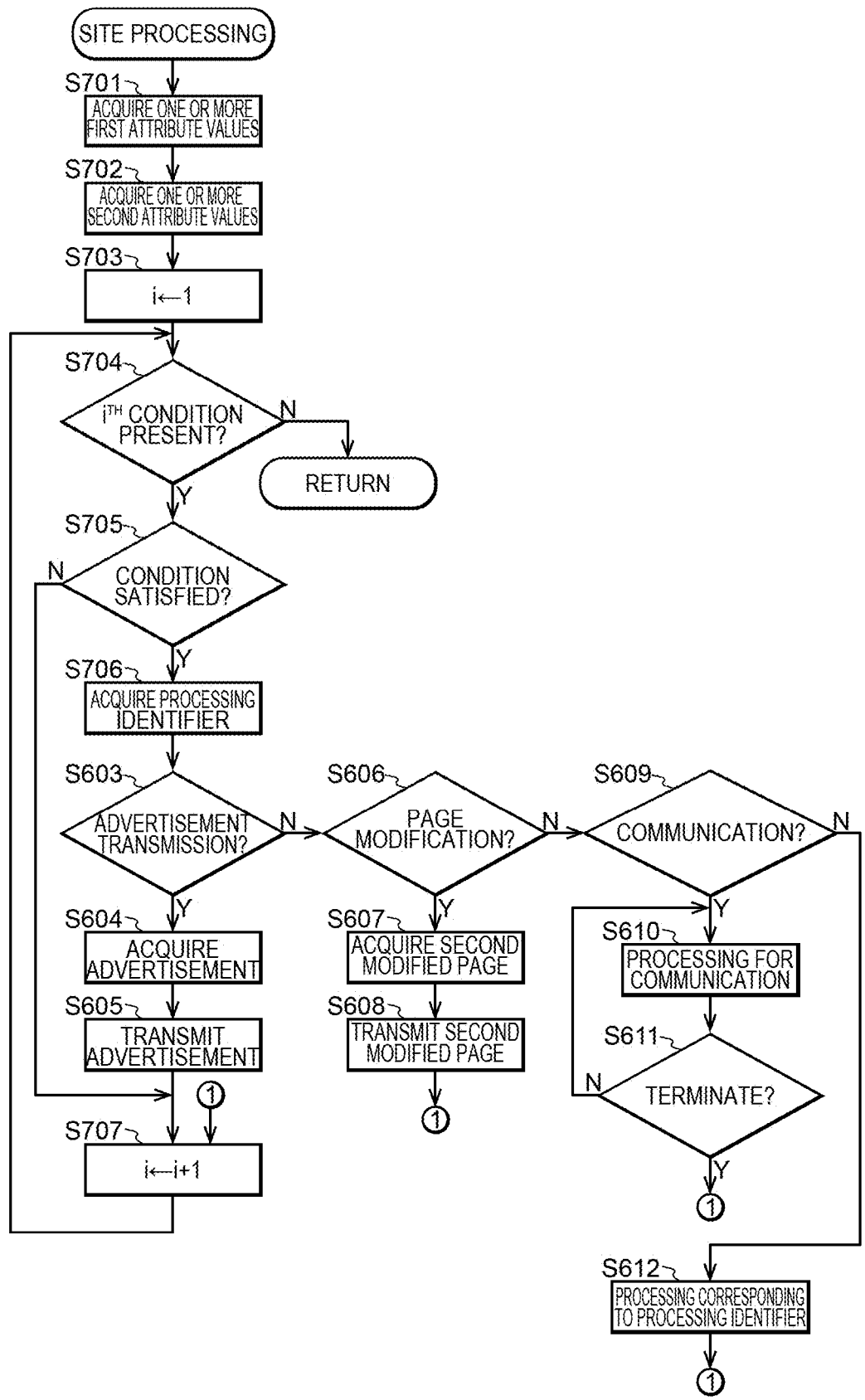
FIG. 7 is a flowchart illustrating an example of site processing according to the same.

Next, an example of the site processing in step S514 will be described with reference to the flowchart in FIG. 7. The descriptions of the same steps in the flowchart in FIG. 7 as in the flowchart in FIG. 6 will be omitted.

(Step S701) The site processing unit 234 acquires one or more first attribute values. Such one or more first attribute values are typically the attribute values of the user from which operation information has recently been received.

(Step S702) The site processing unit 234 acquires one or more second attribute values. Such one or more second attribute values are typically the attribute values of the user from which operation information has recently been received.

(Step S703) The site processing unit 234 substitutes 1 for a counter i.

(Step S704) The site processing unit 234 judges whether or not an $i^{th}$ condition is present in the dynamic processing information storage unit 212. If the $i^{th}$ condition is present, processing proceeds to step S705, and if the $i^{th}$ condition is not present, processing returns to higher level processing.

(Step S705) The site processing unit 234 judges whether or not the one or more first attribute values acquired in step S701 and the one or more second attribute values acquired in step S702 match the $i^{th}$ condition. If they match, processing proceeds to step S706, and if they don't match, processing proceeds to step S707.

(Step S706) The site processing unit 234 acquires a processing identifier that is paired with the $i^{th}$ condition from the dynamic processing information storage unit 212. Processing proceeds to step S603.

(Step S707) The site processing unit 234 increments the counter i by 1. Processing returns to step S704.

Next, an example of processing performed by each management terminal 4 will be described with reference to the flowchart in FIG. 8.

(Step S801) The management reception unit 45 judges whether or not information regarding the user has been received from the information processing device 2. If information has been received, processing proceeds to step S802, and if information has not been received, processing proceeds to step S803. Note that information regarding the user contains one or more attribute values. It is preferable that information regarding the user contains thumbnail images.

(Step S802) The management output unit 46 outputs the information received in step S801. Processing returns to step S801. It is preferable that information regarding the user is selectable by the administrator.

(Step S803) The management acceptance unit 32 judges whether or not to start communication. When communication is to be started, processing proceeds to step S804, and if communication is not to be started, processing proceeds to step S807.

(Step S804) The management processing unit 43 performs processing for communication.

(Step S805) The management acceptance unit 32 judges whether or not an instruction to terminate communication has been accepted. If an instruction to terminate communication has been accepted, processing proceeds to step S806, and if an instruction to terminate communication has not been accepted, processing returns to step S804.

(Step S806) The management processing unit 43 performs processing to terminate communication. Processing returns to step S801. Note that the processing performed to terminate communication is, for example, processing performed to transmit an instruction to terminate communication to the information processing device 2. The processing performed to terminate communication is known processing.

(Step S807) The management acceptance unit 32 judges whether or not dynamic processing information has been accepted. If dynamic processing information has been accepted, processing proceeds to step S808, and if dynamic processing information has not been accepted, processing returns to step S801.

(Step S808) The management processing unit 43 changes the structure of the dynamic processing information accepted in step S808 to the structure of information to be transmitted. Thereafter, the management transmission unit 44 transmits the dynamic processing information to the information processing device 2. Processing returns to step S801. Note that the dynamic processing information transmitted at this time is accumulated in the information processing device 2.

(Step S809) The management acceptance unit 32 judges whether or not a selection instruction has been accepted. If a selection instruction has been accepted, processing proceeds to step S810, and if a selection instruction has not been accepted, processing returns to step S801.

(Step S810) The management processing unit 43 converts the structure of the selection instruction accepted in step S809 to the structure of data to be transmitted. For example, the management processing unit 43 forms a selection instruction that contains the user identifier of the selected user. Thereafter, the management transmission unit 44 transmits the selection instruction to the information processing device 2. Processing returns to step S801.

Figure 8:
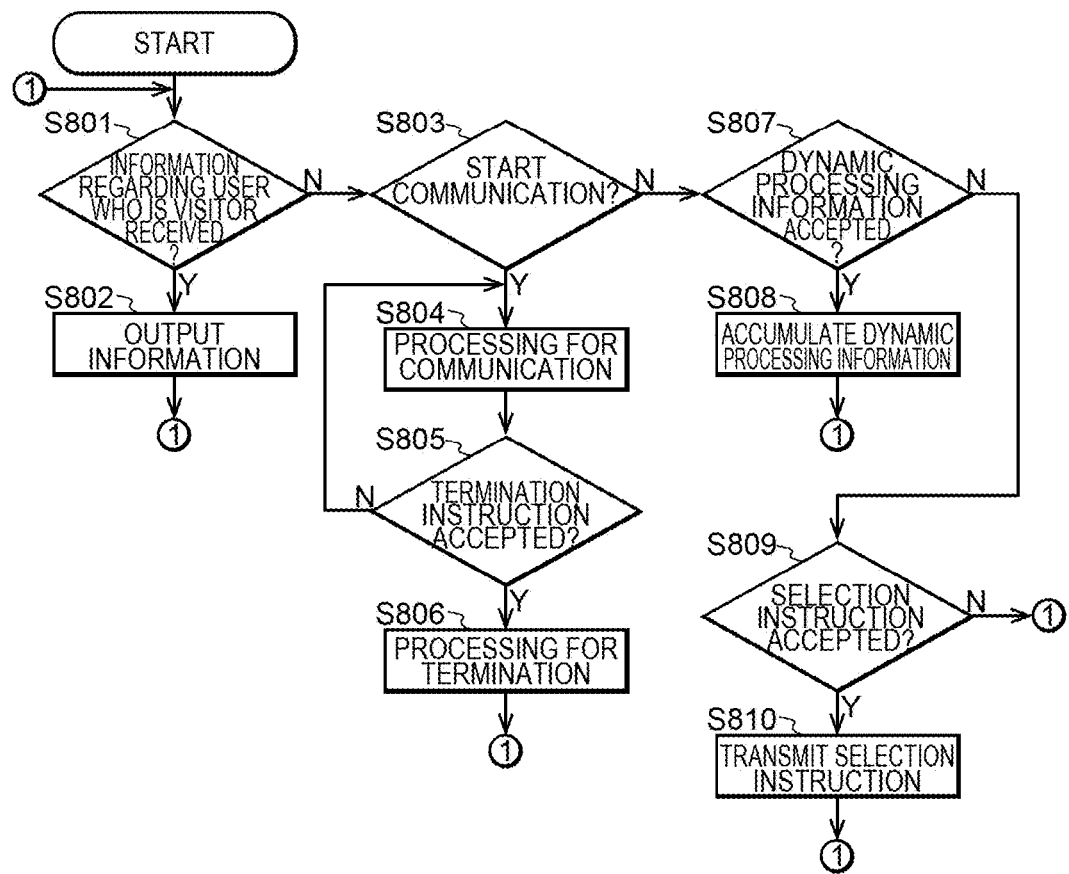
FIG. 8 is a flowchart illustrating an example of processing performed by a management terminal 4 according to the same.

Note that, in the flowchart shown in FIG. 8, processing is terminated when power is turned off or an interruption is made to terminate the processing.

Hereinafter, examples of specific operations of the information system A according to the present embodiment will be described.

Now, it is assumed that the dynamic processing information storage unit 212 of the information processing device 2 stores the dynamic processing information management table shown in FIG. 9. The dynamic processing information management table is a table that stores one or more pieces of dynamic processing information. The dynamic processing information management table stores records each containing an "ID", "conditions", and a "processing identifier". The "ID" is information identifying a record. The "conditions" contain a "first condition" and a "second condition". The "first condition" contains a "first site identifier" and a "first attribute value". The "second condition" contains a "second site identifier" and a "second attribute value". If the "first condition" and the "second condition" are satisfied, processing identified by the "processing identifier" is performed. A value "−(NULL)" indicates that no condition is contained.

In FIG. 9, the record with "ID=1" indicates that "chat (URL2)" is executed when it is detected that a user who has performed an operation where the first attribute value of the site with the site identifier "URL1" satisfies "score>=70" subsequently moves to the site indicated by the site identifier "URL2" and stays for one minute or longer. The function "chat (URL2)" is executed to allow the user and the administrator that corresponds to URL2 to perform a chat.

The record with "ID=2" indicates that "advertisement output (purchase amount)" is executed when a user who made a purchase of "purchase amount>=10,000 yen" on the site with the site identifier "URL1" and stayed for 1 minute or longer subsequently visits from the site indicated by "URL1" to the site with the site identifier "URL2". The function "advertisement output (purchase amount)" is executed to transmit an advertisement corresponding to the first attribute value "purchase amount" on the site indicated by "URL1" to the user terminal 1.

The record with "ID=3" indicates that "second modified page output (discount page)" is executed when a user who has performed an operation whose first attribute value satisfies "purchased product type=PC" (a user who purchased a PC) on the site with the site identifier "URL2" subsequently visits the site with the site identifier "URL3" and performs an operation whose second attribute value is "user type=excellent". The function "second modified page output (discount page)" is executed to transmit, instead of the second page, a discount page on which the price of the product is discounted, to the user terminal 1.

Note that the function with the operation identifier "chat (argument)" is a function that is executed to perform processing to start a chat between the management terminal 4 corresponding to the argument and the user terminal 1 of the user. The function with the operation identifier "advertisement output (purchase amount)" is a function that is executed to perform processing to acquire an advertisement corresponding to the attribute value "purchase amount" and transmit the advertisement to the user terminal 1. The function "second modified page output (argument)" is a function that is executed to perform processing to acquire the second modified page corresponding to the argument and transmit the second modified page to the user terminal 1.

The storage unit 21 also stores the estimation condition processing management table shown in FIG. 10. The estimation condition processing management table is a table used to estimate the second attribute value when the estimation conditions are satisfied, and execute processing corresponding to the second attribute value when the second attribute value matches a processing condition. The estimation condition processing management table can store one or more records each containing an "ID", "estimation conditions", a "processing condition", and a "processing identifier". The "ID" is information identifying a record. The "estimation conditions" include a "first site identifier" and a "second site identifier". The "first site identifier" is the identifier of the first site in a case where the estimated second attribute values are to be acquired. The "second site identifier" is the identifier of the second site in a case where the estimated second attribute values are to be acquired. The "processing condition" is a condition for performing processing on the second site, and is a condition regarding the estimated second attribute values. The "processing identifier" is the identifier of the processing to be performed on the second site when the "processing condition" is satisfied.

The storage unit 21 also stores the advertisement management table shown in FIG. 11. The advertisement management table here is a table that is used to manage an advertisement to be transmitted to the user terminal 1 when the second site visited by the user is "URL2". The advertisement management table stores one or more records each containing an "ID", a "purchase amount (B)", and an "advertisement". The "ID" is information identifying a record. The purchase amount (B) is a condition, and is information indicating the range of the attribute value "purchase amount" of the user on the first site identified by the first site identifier here. The "advertisement" is information specifying the advertisement to be acquired when the condition "purchase amount (B)" is satisfied, and is a file name here. In FIG. 11, for example, the record with "ID=2" is a record that is used to "transmit an advertisement identified by "file2" to the user terminal 1 of a user who made a purchase of no lower than 1000 yen and no higher than 3000 yen on the first site, after the user moves to the second site".

Although the advertisement is stored in the storage unit 21, for example, the advertisement may be stored in another device such as the web server 3 specified by the URL2.

The storage unit 21 also stores the management terminal management table shown in FIG. 12. The management terminal management table is a table that is used to manage a management terminal 4 for each site. The management terminal management table stores one or more records each containing an "ID", a "site identifier", and a "communication destination identifier". The "ID" is information identifying a record. The "communication destination identifier" is information used to communicate with the management terminal 4, and is an ID used to perform a chart in this example, but may be other information such as an IP address.

Furthermore, the user information storage unit 211 stores the user information management table having the structure shown in FIG. 13. The user information management table here stores one or more records each containing an "ID", a "date", "first information", and "second information". The "ID" is information identifying a record. The "date" is the date on which the first information and the second information were stored. The "first information" contains a "first site identifier" and "first attribute values". The "second information" contains a "second site identifier" and "second attribute values". The "first site identifier" is the identifier of the first site visited by the user. The "first attribute values" are one or more first attribute values acquired based on one or more pieces of operation information of the user on the first site. The "second site identifier" is the identifier of the second site visited by the user subsequent to the visit to the first site. The "second attribute values" are one or more second attribute values acquired based on one or more pieces of operation information of the user on the second site.

Four specific examples in such a situation will be described next. It is assumed that the sites indicated by URL1, URL2, and URL3 are EC sites. Specific example 1 is a case where a chat is performed between the user terminal 1 and the management terminal 4 using the first attribute values and the second attribute values. Specific example 2 is a case where an advertisement is transmitted to the user terminal 1, using the first attribute value, while the user is visiting the second site. Specific example 3 is a case where the learning unit 233 performs learning processing to acquire a learning model. Specific example 4 is a case where a second attribute value is estimated using the first attribute value and learning information, and processing is performed on the second site, using the second attribute value.

Specific Example 1

It is assumed that a user A operates the user terminal 1 to access the site indicated by "URL1", and the user terminal 1 receives the site indicated by "URL1" from the web server 3 corresponding to "URL1" and outputs the site. Thereafter, the user A performs various operations on the user terminal 1 to move in the site indicated by "URL1", designate a button X in the site indicated by "URL1", and move to a second site indicated by "URL2". During such operations, one or more pieces of operation information are transmitted from the user terminal 1 to the web server 3 corresponding to "URL1", and the display of the web page on the user terminal 1 is changed according to the one or more pieces of operation information. The user terminal 1 or the web server 3 corresponding to "URL1" transmits one or more pieces of operation information to the information processing device 2. Note that the one or more pieces of operation information include a click ID (C) that is generated when the button X is designated. The one or more pieces of operation information are associated with "URL1".

It is also assumed that the attribute value acquisition unit 232 of the information processing device 2 acquires the first attribute values "purchase amount=0", "stay time=1 minute 58 seconds", and "score=72", using one or more pieces of operation information corresponding to "URL1", and the second attribute values are stored in the user information storage unit 211 in association with the today's date (4/27) and the site identifier "URL1". Note that the today's date is information acquired from a clock (not shown).

It is assumed that, next, the user terminal 1 receives the site indicated by "URL2" from the web server 3 corresponding to "URL2" and outputs the site in response to the user A designating the button X. Thereafter, the user A operates the user terminal 1 and the display of the site indicated by "URL2" is changed on the user terminal 1. During such operations, the user terminal 1 transmits one or more pieces of operation information to the web server 3 corresponding to "URL2". The user terminal 1 or the web server 3 corresponding to "URL2" transmits one or more pieces of operation information to the information processing device 2. Note that the one or more pieces of operation information include a piece of operation information that contains a click ID (C) that is generated when the button X is designated on the site indicated by "URL1". The one or more pieces of operation information are associated with "URL2".

It is assumed that while the user A is staying on the site indicated by "URL2", the attribute value acquisition unit 232 acquires the second attribute values "purchase amount=1,280", "stay time=1 minute 5 seconds", and "user type=normal", using the received one or more pieces of operation information corresponding to "URL2", and accumulates the second attribute values in the user information storage unit 211 in association with the today's date (4/27) and the site identifier "URL2".

The attribute value acquisition unit 232 associates the one or more first attribute values and one or more second attribute values with each other, using the "click ID (C)" commonly contained in the operation information on which the first attribute values are based and the operation information on which the second attribute values are based. As a result, the attribute value acquisition unit 232 acquires the record indicated by "ID=1" shown in FIG. 13.

Next, the site processing unit 234 judges whether or not the acquired one or more first attribute values and one or more second attribute values satisfy any of the conditions of the records in FIG. 9. Here, the site processing unit 234 judges that the one or more first attribute values and the one or more second attribute values satisfy the conditions corresponding to "ID=1" in FIG. 9. Next, the site processing unit 234 acquires the processing identifier "chat (URL2)" corresponding to "ID=1" in FIG. 9. Next, the site processing unit 234 searches the table in FIG. 12, using "chat (URL2)", to acquire the communication destination identifier "administrator ID=M2" corresponding to "URL2". Thereafter, the site processing unit 234 performs processing to start a chat between the user terminal 1 of the site processing unit 234 and the management terminal 4 that is communicable using "administrator ID=M2".

Thereafter, a chat between the user terminal 1 of the user A and the management terminal 4 with "administrator ID=M2".

Through the above processing, the user who performed an operation that satisfied a predetermined condition on the first site moves from the first site to the second site, and predetermined processing can be performed for the user who performed an operation that satisfied a predetermined condition on the second site. Note that the predetermined processing here is processing that is performed to realize a chat between the administrator and the user. Note that, through such processing, the administrator can support the user's actions (for example, purchasing products) on the second site.

Specific Example 2

It is assumed that a user B operates the user terminal 1 to access the site indicated by "URL1", and the user terminal 1 receives the site indicated by "URL1" from the web server 3 corresponding to "URL1" and outputs the site. It is assumed that the user B thereafter operates the user terminal 1 to, for example, purchase a product on the site indicated by "URL1". It is assumed that the user B thereafter designates the button X in the site indicated by "URL1", and moves to the second site indicated by "URL2". During such operations, one or more pieces of operation information are transmitted from the user terminal 1 to the web server 3 corresponding to "URL1", and the display on the user terminal 1 is changed according to the operation information. The user terminal 1 or the web server 3 corresponding to "URL1" transmits one or more pieces of operation information to the information processing device 2. Note that the one or more pieces of operation information include a click ID (C) that is generated when the button X is designated. The one or more pieces of operation information are associated with "URL1".

It is also assumed that the attribute value acquisition unit 232 of the information processing device 2 acquires the first attribute values "purchase amount=18,000", "stay time=5 minutes 10 seconds", and "score=59", using one or more pieces of operation information corresponding to "URL1", and the second attribute values are stored in the user information storage unit 211 in association with the today's date (4/27) and the site identifier "URL1". Note that the today's date is information acquired from a clock (not shown).

It is assumed that, next, the user terminal 1 receives the site indicated by "URL2" from the web server 3 corresponding to "URL2" and outputs the site in response to the user B designating the button X. Thereafter, the user A operates the user terminal 1 and the display of the site indicated by "URL2" is changed on the user terminal 1. During such operations, the user terminal 1 transmits one or more pieces of operation information to the web server 3 corresponding to "URL2". The user terminal 1 or the web server 3 corresponding to "URL2" transmits one or more pieces of operation information to the information processing device 2. Note that the one or more pieces of operation information include a piece of operation information that contains a click ID (C) that is generated when the button X is designated on the site indicated by "URL1". The one or more pieces of operation information are associated with "URL2".

The attribute value acquisition unit 232 associates the first site identifier "URL1" and the one or more first attribute values and the second site identifier "URL2", using the "click ID (C)" commonly contained in the operation information on which the first attribute values are based and the operation information on which the second attribute values are based. As a result, the attribute value acquisition unit 232 acquires information contained in the record that is indicated by "ID=2" in FIG. 13 and does not contain "second attribute values". Note that at this stage, the user B has visited the second site indicated by "URL2".

Next, the site processing unit 234 judges whether or not the information in the record that is indicated by "ID=2" in FIG. 13 and does not contain "second attribute values" satisfies any of the conditions of the records in FIG. 9. Here, the site processing unit 234 judges that the conditions indicated by "ID=2" in FIG. 9 are satisfied.

Next, the site processing unit 234 acquires the processing identifier "advertisement output (purchase amount=18,000) indicated by "ID=2" in FIG. 9. Next, the site processing unit 234 searches the table in FIG. 11, using "advertisement output (18,000)", and acquires the advertisement "file6". Next, the site processing unit 234 acquires the advertisement with the file name "file6" from the storage unit 21 or the web server 3 corresponding to "URL2". Next, the site processing unit 234 transmits the advertisement with the file name "file6" to the user terminal 1.

Next, the user terminal 1 receives and outputs the advertisement with the file name "file6". As a result, the advertisement with the file name "file6" is displayed on the user terminal 1 together with the site indicated by "URL2".

Through the above processing, when a user who has performed an operation that satisfies a predetermined condition on the first site moves from the first site to the second site, predetermined processing can be performed. Note that the predetermined processing here is processing that is performed to present an advertisement suitable for the user.

Specific Example 3

The learning unit 233 of the information processing device 2 performs learning processing on each pair of the first site and the second site to acquire a learning model, using two or more pieces of training data each containing first attribute values and second attribute values, and accumulates the learning model in the learning information storage unit 214 in association with the pairs of the first site identifier and the second site identifier.

That is to say, for example, the learning unit 233 acquires all pairs of the one or more first attribute values and the second attribute value "user type" of the records that contain the first site identifier "URL1" and the second site identifier "URL2" (for example, pairs of the one or more first attribute values and the second attribute values "user type" of the records indicated by "ID=1, 2, etc.") from the table in FIG. 13, and performs machine learning processing on information regarding the plurality of pairs, to acquire a learning model. Thereafter, the learning unit 233 accumulates the learning model in the learning information storage unit 214 while pairing the first site identifier "URL1" and the second site identifier "URL2" with each other.

Note that such a learning model is a learning model that employs the one or more first attribute values (in this example, the purchase amount, the stay time, and the score) as explanatory variables, and the second attribute value (in this example, the user type) as an objective variable.

Similarly, the learning unit 233 performs machine learning processing on all pairs of the one or more first attribute values and the second attribute value "score" of the records that contain the first site identifier "URL2" and the second site identifier "URL3" (for example, pairs of the one or more first attribute values and the second attribute values "score" of the records indicated by "ID=3, etc.") to acquire a learning model, and accumulates the learning model in the learning information storage unit 214 while pairing the first site identifier "URL2" and the second site identifier "URL3" with each other.

Note that such a learning model is a learning model that employs the one or more first attribute values (in this example, the purchase amount, the stay time, and the user score) as explanatory variables, and the second attribute value (in this example, the score) as an objective variable.

The learning unit 233 performs the above processing on each pair of the first site and the second site, and accumulates a learning model in the learning information storage unit 214 for each pair.

Through the above processing, the information processing device 2 can acquire a learning model.

Specific Example 4

It is assumed that a user D operates the user terminal 1 to access the site indicated by "URL1", and the user terminal 1 receives the site indicated by "URL1" from the web server 3 corresponding to "URL1" and outputs the site. It is assumed that the user B thereafter operates the user terminal 1 to, for example, purchase a product on the site indicated by "URL1". It is assumed that the user D thereafter designates the button X in the site indicated by "URL1", and moves to the second site indicated by "URL2". During such operations, one or more pieces of operation information are transmitted from the user terminal 1 to the web server 3 corresponding to "URL1", and the display on the user terminal 1 is changed according to the operation information. The user terminal 1 or the web server 3 corresponding to "URL1" transmits one or more pieces of operation information to the information processing device 2. Note that the one or more pieces of operation information include a click ID (C) that is generated when the button X is designated. The one or more pieces of operation information are associated with "URL1".

It is also assumed that the attribute value acquisition unit 232 of the information processing device 2 acquires the first attribute values "purchase amount=38,000", "stay time=3 minutes 10 seconds", and "score=88", using one or more pieces of operation information corresponding to "URL1". It is assumed that the attribute value acquisition unit 232 thereafter accumulates the first attribute values in the user information storage unit 211 in association with the today's date (4/27) and the site identifier "URL1". Note that the today's date is information acquired from a clock (not shown).

It is assumed that, next, the user terminal 1 receives the site indicated by "URL2" from the web server 3 corresponding to "URL2" and outputs the site in response to the user D designating the button X. Thereafter, the user A operates the user terminal 1 and the display of the site indicated by "URL2" is changed on the user terminal 1.

The user terminal 1 or the web server 3 corresponding to "URL2" transmits operation information that contains the click ID (C) generated when the button X is designated, to the information processing device 2. Such operation information is associated with "URL2".

Next, the site processing unit 234 acquires the first site identifier "URL1" and the second site identifier "URL2". Thereafter, the site processing unit 234 judges that the first site identifier "URL1" and the second site identifier "URL2" satisfy the estimated conditions indicated by "ID=1" in the table in FIG. 10.

Next, the site processing unit 234 acquires the learning model paired with the first site identifier "URL1" and the second site identifier "URL2" from the learning information storage unit 214. Note that such a learning model is a learning model acquired through the processing in Specific Example 3.

Next, it is assumed that the site processing unit 234 subsequently assigns the learning model, the acquired first attribute values "purchase amount=38,000: stay time=3 minutes 10 seconds: score=88" to the machine learning prediction module, and acquires a user type "excellent".

Next, the site processing unit 234 judges that the user type "excellent" matches the processing condition indicated by "ID=1" in the table in FIG. 10. Next, the site processing unit 234 acquires the processing identifier "second modified page output (discount page)" indicated by "ID=1", and executes the processing corresponding to the processing identifier "second modified page output (discount page)".

Thereafter, the site processing unit 234 acquires the second modified page modified from the second page of the second site, from the storage unit 21 or the web server 3, for example, and transmits the second modified page to the user terminal 1 of the user D.

The user terminal 1 of the user D receives the second modified page and outputs the second modified page instead of the second page of the second site. Note that the second change page is a page that sells products at a lower price than the second page.

Through the above processing in Specific Example 4, it is possible to estimate the attribute values of the user, using learning information acquired using operation information on two or more sites, and provide appropriate processing to the user. Note that the appropriate processing here is processing that is performed to transmit a web page different from that in normal cases. The web page different from that in normal cases is a web page corresponding to the estimated attribute values.

According to the present embodiment, useful processing can be performed using operation information on at least two sites. Note that examples of useful processing include processing that is performed to provide an advertisement, processing that is performed to transmit a web page that is different from that in normal cases, processing that is performed to realize communication between a user and an administrator, and so on.

Furthermore, according to the present embodiment, appropriate processing can be provided to a user who jumps from the first site to the second site.

Note that the processing in the present embodiment may be realized using software. This software may be distributed through software downloading or the like. Also, this software may be recorded on a recording medium such as a CD-ROM and distributed. Note that the same applies to the other embodiments in the present description. The software that realizes the information processing device 2 according to the present embodiment is the program described below. That is to say, this program is a program for enabling a computer to function as: an operation information reception unit that receives one or more pieces of first operation information on a first site regarding a user, and one or more pieces of second operation information on a second site regarding the user; an attribute value acquisition unit that acquires a first attribute value of the user, using the one or more pieces of first operation information, and acquires a second attribute value of the user, using the one or more pieces of second operation information; and a site processing unit that performs predetermined processing on the first site or the second site, using the first attribute value and the second attribute value.

Figure 14:
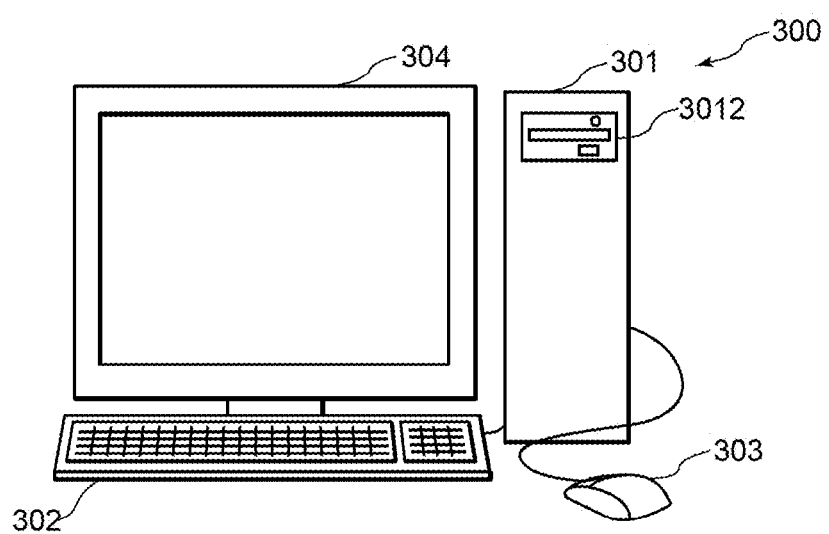
FIG. 14 is an overview of a computer system according to the same.

FIG. 14 shows an example of the external appearance of a computer that executes the program described in the present specification and realizes the information processing device 2 and so on according to the various embodiments described above. The above-described embodiments can be realized using computer hardware and a computer program executed thereon. FIG. 14 is an overview diagram for this computer system 300, and FIG. 15 is a block diagram for the system 300.

In FIG. 14, the computer system 300 includes a computer 301 that includes a CD-ROM drive, a keyboard 302, a mouse 303, and a monitor 304. Note that the user terminals 1 and the management terminals 4 may further include a microphone, a camera, a speaker, and so on.

Figure 15:
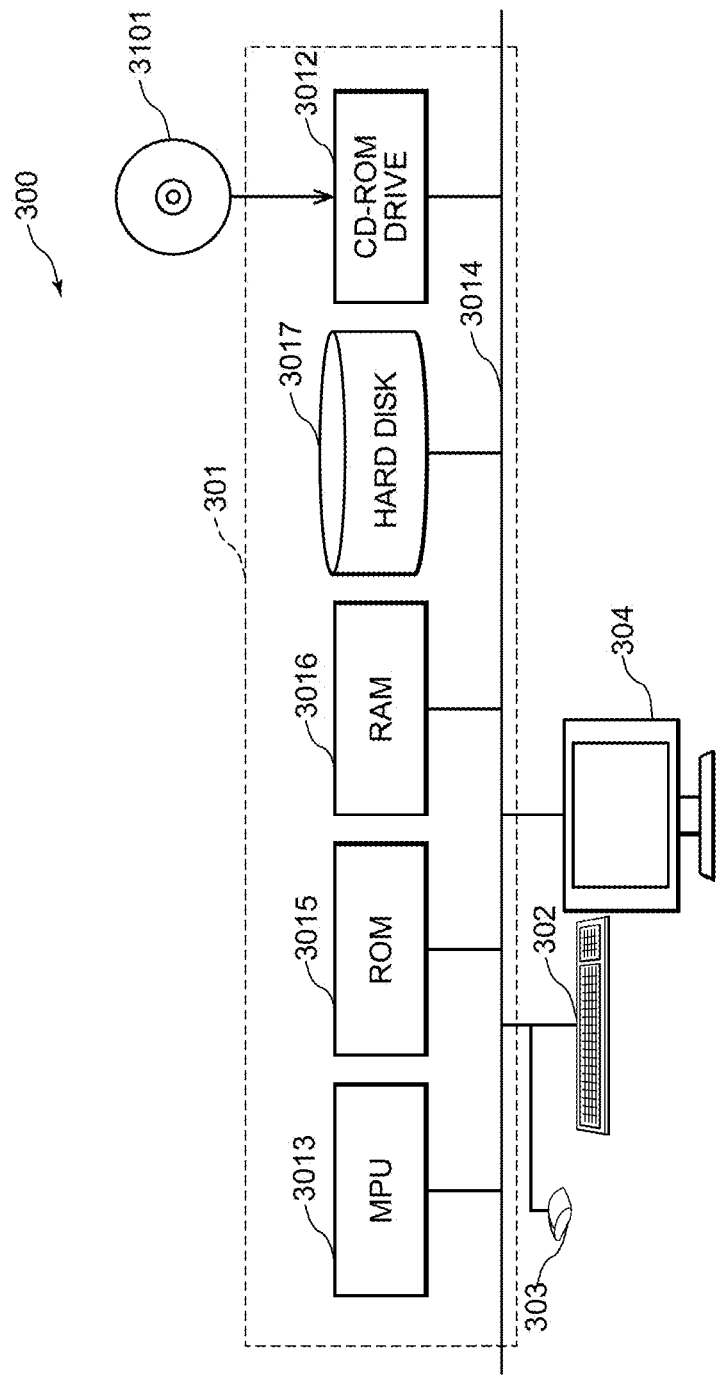
FIG. 15 is a block diagram for the computer system according to the same.

In FIG. 15, the computer 301 includes, in addition to the CD-ROM drive 3012, an MPU 3013, a bus 3014 that is connected to the CD-ROM drive 3012 and so on, a ROM 3015 for storing programs such as a boot-up program, a RAM 3016 that is connected to the MPU 3013 and is used to temporarily store application program instructions and provide a temporary storage space, and a hard disk 3017 for storing application programs, system programs, and data. Here, although not shown in the drawings, the computer 301 may further include a network card that provides connection to a LAN.

The program that enables the computer system 300 to perform the functions of the information processing device 2 and so on according to the above-described embodiments may be stored in the CD-ROM 3101, inserted into the CD-ROM drive 3012, and furthermore transferred to the hard disk 3017. Alternatively, the program may be transmitted to the computer 301 via a network (not shown) and stored on the hard disk 3017. The program is loaded into the RAM 3016 when the program is to be executed. The program may be directly loaded from the CD-ROM 3101 or the network.

The program does not necessarily have to include an operating system (OS), a third-party program, or the like that enables the computer 301 to perform the functions of the information processing device 2 and so on according to the above-described embodiments. The program need only contain the part of the instruction that calls an appropriate function (module) in a controlled manner to achieve a desired result. How the computer system 300 works is well known and the detailed descriptions thereof will be omitted.

In the above-described program, the step of transmitting information, the step of receiving information, and so on do not include processing performed by hardware, such as processing performed by a modem or an interface card in the step of transmitting (processing that can only be performed by hardware).

There may be a single or multiple computers executing the above-described program. That is to say, centralized processing or distributed processing may be performed. For example, the learning processing performed by the learning unit 233 of the information processing device 2 may be performed by a device other than the information processing device 2.

Also, as a matter of course, in each of the above-described embodiments, two or more communication means that are present in one device may be physically realized using one medium.

Also, in the above-described embodiments, each kind of processing may be realized as centralized processing that is performed by a single device, or distributed processing that is performed by multiple devices.

As a matter of course, the present invention is not limited to the above-described embodiments, and various changes are possible, and such variations are also included within the scope of the present invention.

INDUSTRIAL APPLICABILITY

As described above, the information processing device 2 according to the present invention has the effect of being able to perform useful processing using operation information on two sites, and is useful as a server or the like that supports the utilization of websites.

The invention claimed is:

1. An information processing method realized using an operation information reception unit, an attribute value acquisition unit, and a site processing unit, comprising:
   an operation information reception step in which the operation information reception unit receives one or more pieces of first operation information regarding a user on a first site;
   an attribute value acquisition step in which the attribute value acquisition unit acquires a first attribute value of the user, using the one or more pieces of first operation information; and
   a site processing step in which the site processing unit performs estimates a second attribute value of the user who has visited a second site from the first site, using the first attribute value of the user and learning information, and performs predetermined processing on the second site, using the estimated second attribute value,
   wherein the learning information is acquired using a set of first attribute values and second attribute values of two or more users.

2. An information processing device comprising:
   an operation information reception unit that receives one or more pieces of first operation information regarding a user on a first site;
   an attribute value acquisition unit that acquires a first attribute value of the user, using the one or more pieces of first operation information;
   a learning information storage unit that stores learning information acquired using a set of first attribute values and second attribute values of two or more users; and
   a site processing unit that estimates a second attribute value of the user who has visited a second site from the first site, using the first attribute value of the user and the learning information, and performs predetermined processing on the second site, using the estimated second attribute value.

3. The information processing device according to claim 2,
   wherein the first attribute value or the second attribute value is a user type.

4. The information processing device according to claim 2, wherein the predetermined processing on the second site includes at least one of:
   a process of acquiring an advertisement corresponding to the estimated second attribute values, and transmitting the advertisement to a terminal of the user;
   a process of acquiring a second modified page modified from a second web page of the second site, based on the estimated second attribute values, and transmitting the second modified page to the terminal of the user terminal;

a process of starting communication with a management terminal, the communication including at least one of a chat or a web conference; or a process of inquiring of the management terminal whether or not to communicate with the user in order to acquire permission to start communication.

5. The information processing device according to claim 2, wherein:

each of the first user attribute and the second user attribute includes a static attribute value that does not change from moment to moment, and the static attribute value includes at least one of a name, an age, an address, a telephone number, a credit card number, an email address, a user terminal identifier, a user identifier, or a password.

6. The information processing device according to claim 2, wherein:

each of the first user attribute and the second user attribute includes a dynamic attribute value that dynamically changes according to a user's operation, and the dynamic attribute value includes at least one of a stay time on a web page currently viewed by the user, a number of web pages viewed during the current stay, a user type, a number of purchases, a purchase amount, a total purchase amount, an average stay time, an average number of page views, a number of visits, a score, or a user type.

7. The information processing device according to claim 2, wherein the learning information is acquired by machine learning processing on the set of first attribute values and second attribute values of two or more users.

8. The information processing device according to claim 2, wherein the learning information is acquired by using an arithmetic expression that takes one or more first attribute values as input and a second attribute value as an output, which is obtained by a regression analysis on the set of first attribute values and second attribute values of two or more users.

9. A non-transitory computer readable recording medium having recorded thereon a program for enabling a computer to function as:

an operation information reception unit that receives one or more pieces of first operation information regarding a user on a first site;

an attribute value acquisition unit that acquires a first attribute value of the user; and a site processing unit that estimates a second attribute value of the user who has visited a second site from the first site, using the first attribute value of the user and learning information, and performs predetermined processing on the second site, using the estimated second attribute value, wherein the learning information is acquired using a set of first attribute values and second attribute values of two or more users.

* * * * *